(12) United States Patent
Chiang et al.

(10) Patent No.: US 7,939,201 B2
(45) Date of Patent: May 10, 2011

(54) NANOSCALE ION STORAGE MATERIALS INCLUDING CO-EXISTING PHASES OR SOLID SOLUTIONS

(75) Inventors: Yet-Ming Chiang, Framingham, MA (US); Antoni S. Gozdz, Marlborough, MA (US); Martin W. Payne, Avon, OH (US)

(73) Assignee: A123 Systems, Inc., Watertown, MA (US)

( * ) Notice: Subject to any disclaimer, the term of this patent is extended or adjusted under 35 U.S.C. 154(b) by 1142 days.

(21) Appl. No.: 11/396,515

(22) Filed: Apr. 3, 2006

(65) Prior Publication Data

US 2007/0031732 A1 Feb. 8, 2007

Related U.S. Application Data

(60) Provisional application No. 60/706,273, filed on Aug. 8, 2005, provisional application No. 60/741,606, filed on Dec. 2, 2005.

(51) Int. Cl.
*H01M 4/58* (2010.01)
(52) U.S. Cl. ............... 429/231.95; 429/218.1; 423/306
(58) Field of Classification Search .................. None
See application file for complete search history.

(56) References Cited

U.S. PATENT DOCUMENTS

| | | | |
|---|---|---|---|
| 5,609,975 A | 3/1997 | Hasegawa et al. | |
| 5,705,296 A | 1/1998 | Kamauchi et al. | |
| 5,910,382 A | 6/1999 | Goodenough et al. | |
| 6,156,931 A | 12/2000 | Lewis | |
| 6,322,929 B1 | 11/2001 | Takada et al. | |
| 6,440,606 B1 | 8/2002 | Yoshizawa et al. | |
| 6,514,640 B1 | 2/2003 | Armand et al. | |
| 6,528,033 B1 | 3/2003 | Barker et al. | |
| 6,596,435 B2 | 7/2003 | Kelley | |
| 6,620,550 B2 | 9/2003 | Christian | |
| 6,656,635 B2 | 12/2003 | Okawa et al. | |
| 6,702,961 B2 | 3/2004 | Barker | |
| 6,716,372 B2 | 4/2004 | Barker | |
| 6,730,281 B2 | 5/2004 | Barker | |
| 6,749,967 B2 | 6/2004 | Li | |
| 6,753,112 B2 | 6/2004 | Ooya | |
| 6,835,500 B2 | 12/2004 | Masquelier | |
| 6,960,331 B2 | 11/2005 | Barker et al. | |
| 7,025,907 B2 | 4/2006 | Kohzaki | |

(Continued)

FOREIGN PATENT DOCUMENTS

JP 62271370 11/1987

(Continued)

OTHER PUBLICATIONS

Andersson and Thomas, J. Power Sources, 97: 498-502 (2001).
Chiang et al., "Characterization of Grain Boundary Segregation in MgO," J. Am. Ceram. Soc., 64:383-89 (1981).

(Continued)

*Primary Examiner* — Ula C Ruddock
*Assistant Examiner* — Tony Chuo
(74) *Attorney, Agent, or Firm* — Wilmer Cutler Pickering Hale and Dorr LLP

(57) ABSTRACT

Nanoscale ion storage materials are provided that exhibit unique properties measurably distinct from their larger scale counterparts. For example, the nanoscale materials can exhibit increased electronic conductivity, improved electro-mechanical stability, increased rate of intercalation, and/or an extended range of solid solution. Useful nanoscale materials include alkaline transition metal phosphates, such as $LiMPO_4$, where M is one or more transition metals. The nanoscale ion storage materials are useful for producing devices such as high energy and high power storage batteries, battery-capacitor hybrid devices, and high rate electrochromic devices.

21 Claims, 20 Drawing Sheets

U.S. PATENT DOCUMENTS

| | | | |
|---|---|---|---|
| 7,282,301 | B2 | 10/2007 | Wixom et al. |
| 7,338,734 | B2 | 3/2008 | Chiang et al. |
| 2001/0016284 | A1 | 8/2001 | Kweon |
| 2002/0041998 | A1 | 4/2002 | Hosoya |
| 2002/0047112 | A1 | 4/2002 | Hosoya |
| 2002/0059719 | A1 | 5/2002 | Hosoya |
| 2002/0061274 | A1 | 5/2002 | Hosoya |
| 2002/0086214 | A1 | 7/2002 | Barker |
| 2002/0102459 | A1 | 8/2002 | Hosoya |
| 2002/0110736 | A1 | 8/2002 | Kweon et al. |
| 2002/0114754 | A1 | 8/2002 | Hosoya |
| 2002/0124386 | A1 | 9/2002 | Hosoya |
| 2002/0182497 | A1 | 12/2002 | Kohzaki et al. |
| 2002/0192137 | A1 | 12/2002 | Chaloner-Gill et al. |
| 2002/0195591 | A1 | 12/2002 | Ravet |
| 2004/0005265 | A1 | 1/2004 | Chiang et al. |
| 2004/0175614 | A1 | 9/2004 | Wurm |
| 2005/0003274 | A1 | 1/2005 | Armand et al. |
| 2005/0175525 | A1 | 8/2005 | Fu et al. |
| 2005/0233220 | A1 | 10/2005 | Gozdz et al. |
| 2006/0194113 | A1 | 8/2006 | Okada et al. |
| 2007/0031732 | A1 | 2/2007 | Chiang |
| 2007/0190418 | A1 | 8/2007 | Chiang et al. |
| 2007/0292747 | A1 | 12/2007 | Chiang et al. |

FOREIGN PATENT DOCUMENTS

| | | |
|---|---|---|
| JP | 01-250555 | 10/1989 |
| JP | 3246868 | 5/1991 |
| JP | 05-283075 | 10/1993 |
| JP | 06-283207 | 10/1994 |
| JP | 02-075356 | 3/2002 |
| WO | WO-2002089233 A2 | 11/2002 |
| WO | WO-2003056646 A1 | 7/2003 |
| WO | WO-2005/051840 | 6/2005 |
| WO | WO-2006/046085 | 5/2006 |
| WO | WO-2007/000251 | 1/2007 |
| WO | WO-2008/102270 | 8/2008 |
| WO | WO-2008102271 | 8/2008 |

OTHER PUBLICATIONS

Chiang et al., Physical Ceramics: Principles for Ceramic Science and Engineering, Chapter 3, John Wiley & Sons (1997).

Chiang, "Introduction and Overview: Physical Properties of Nanostructured Materials," J. Electroceramics, 1:205 (1997).

Delacourt et al., "Two-phase vs. one-phase Li+ extraction/insertion mechanisms in olivine-type materials," Abstract 200, 207th Meeting of the Electrochemical Society, Quebec City, CA, May 15-20, 2005.

Ikeda et al., "Space Charge Segregation at Grain Boundaries in Titanium Dioxide: Part I, Relationship Between Lattice Defect Chemistry and Space Charge Potential," J. Am. Ceram. Soc., 76:2437-2446 (1993).

Ikeda et al., "Space Charge Segregation at Grain Boundaries in Titanium Dioxide: Part II, Model Experiments," J. Am. Ceram. Soc., 76:2447-2459 (1993).

International Search Report and Written Opinion, International Patent Application No. PCT/US06/30579, mailed Sep. 16, 2008 (12 pages).

Srinivasan, V. and Newman, J., Journal of the Electrochemical Society, 151:A1517-A1529 (2004).

Teja, Amyn et al. Continuous hydrothermal synthesis of inorganice nanoparticles (including battery electrode materials). *NanoMaterials for Energy Applications*. Georgia Tech School of Chemical and Biomolecular Engineering. (http://www.che.gatech.edu/research/areas/nanotechnology/energy.php) (2 Pgs).

Yamada et al., Electrochemical and Solid State Letters, 8:A409-A413 (2005).

Allen et al. "$LI_{1+x}FE_{1-x}PO_4$: Electronically Conductive Lithium Iron Phospho0olivines with Improved Electrochemical Performance." *The Proceedings of the Electromechanical Society, 204th Meeting* Orlando, Florida Oct. 12-16, 2003, Abs. 347 (pre-print).

Amine et al. "High-temperature storage and cycling of C-LiFePO$_4$/ graphite Li-ion cells," *Electrochemical Comm.* 7:669-672 (2005).

Chen et al. "Reducing Carbon in LiFePO$_4$/C Composite Electrodes to Maximize Specific Energy, Volumetric Energy, and Tap Density." *Journal of the Electromechanical Society*, 149(9) A1184-A1189 (2002).

Chiang et al., "Defect and Transport Properties of Nanocrystalline $CeO_{2-x}$," *Applied Phys. Lett.*, 69:185-187 (1996).

Chiang et al., "Nonstoichiometry and Electrical Conductivity of Nanocrystalline $CeO_{2-x}$," *Journal of Electroceramics*, 1:7-14 (1997).

Chung et al. "Electronically conductive phospho-olivines as lithium storage electrodes" Nature Materials Online Publication. Sep. 22, 2002. (1-6).

Delacourt et al., "The existence of a temperature-driven solid solution in $Li_xFePO_4$ for $0 £ x^3 1$," Nature Materials, 4:254-260 (2005).

Dodd et al., Electrochemical Solid State Lett. 9:A151-A155 (2006).

Huang et al. "Approaching Theoretical Capacity of LiFePO$_4$ at Room Temperature at High Rates," *Electrochemical Solid State Lett.* 4:A170-A172 (2001).

International Search Report, corresponding to International Application No. PCT/US06/46085, mailed Feb. 26, 2008 (4 pgs).

Li et al. "Optimized $LiMn_yFe_{1-y}PO_4$ as the Cathode for Lithium Batteries" *Journal of the Electrochemical Society* 149:A743-A747 (2002).

Meethong et al., "Strain accommodation during phase transformations in olivine-based cathodes as a materials selection criterion for high-power rechargeable batters," *Adv. Functional Mater.*, In press 2006.

Prosini et al. "A New Synthetic Route for Preparing LiFePO$_4$ with Enhanced Electromechanical Performance," *J. Electrochem. Soc.*, 149: A886-A890 (2002).

Shim et al. "The development of low cost LiFePO4-based high power lithium-ion batteries." eScholarship Repository, University of California, 2003. Paper LBNL54098 (8 pages).

Yamada et al. "Phase Diagram of $Li_x(Mn_yFe_{1-y})PO_4$ ($0 \leq x$, $y \leq 1$)" *Journal of the Electromechanical Society*, 148(10) A1153-A1158 (2001).

Yang et al., "Reactivity, stability and electrochemical behavior of lithium iron phosphates" Electrochemical Communication, 4:239-244 (2002).

Zhang et al. "Nanostructured $LiMn_2O_4$ prepared by a glycine-nitrate process for lithium-ion betteries" Solid State Ionics 171 (2004) 25-31.

Zhou et al. The electronic structure and band gap of LiFePO$_4$; *Solid State Communications* 132 (2004) pp. 181-186.

Goodenough et al., "Cathodes for Lithium-Ion Batteries: Some Comparisons", Electrochemical Society of Japan, 66(12):1173-1181 (1998).

International Search Report and Written Opinion, International Patent Application No. PCT/US08/52584, mailed Oct. 1, 2008 (1 page).

Lourenco, A. et al., "Electrochemical and optical characterization of RF-sputtered thin films of vanadium-nickel mixed oxides", Electrochimica Acta 46:2257-2262 (2001).

Ong, T.S. and Yang, H. "Symmetrical Cell for Electrochemical AC Impedance Studies of Lithium Intercalation into Graphite." Electrochemical and Solid-State Letters, 4(7):A89-A92 (2001).

Chung et al. "Electronically Conductive Phospho-Olivines as Lithium Storage Electrodes." Nature Materials. vol. 1, Oct. 2002, 123-128, 6 pages.

Chung, "Correspondence: From Our Readers", Nature Materials, 2:702-703 (2003) 2 pages.

European Search Report for European Patent Application No. 06844738.2 mailed Nov. 16, 2010. 6 pages.

European Search Report for European Patent Application No. 06851633.5 mailed Nov. 11, 2010. 6 pages.

International Search Report issued for PCT/US2009/031552, dated Sep. 1, 2009 4 pages.

Meethong et al. "Electronically Induced Phase Transformation in Nanscale Olivines LiMPO (M=Fe, Mn)" *Chemistry of Materials*. 2008, 20, 6189-6198. 11 pages.

Meethong et al. "Strain Accommodation During Phase Transformations in Olivine-Based Cathodes as a Materials Selection Criterion for High-Power Rechargable Batteries." *Advanced Functional Materials*. 2007, 17, 1115-1123. 9 pages.

Meethong, et al., "Size-Dependent Lithium Miscibility Gap in Nanoscale $Li_{1-x}FePO_4$", Electrochemical and Solid State Letters, 10(5):A134-A138 (2007) (5 pages).

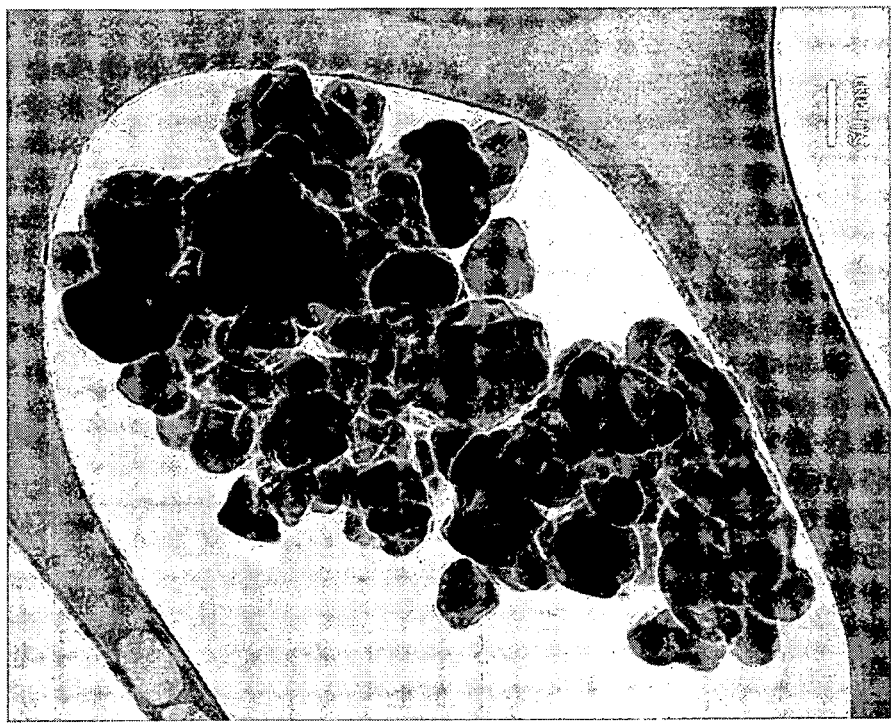
Figure 1. Nanoscale lithium iron phosphate ion storage material.

Bright Field Image

Dark Field Image

NANOSCALE ION STORAGE MATERIALS INCLUDING CO-EXISTING PHASES OR SOLID SOLUTIONS

RELATED APPLICATIONS

This application claims the benefit of priority to co-pending U.S. Application No. 60/706,273, filed Aug. 8, 2005, the contents of which are incorporated by reference.

This application claims the benefit of priority to co-pending U.S. Application No. 60/741,606, filed Dec. 2, 2005, the contents of which are incorporated by reference.

BACKGROUND

1. Field

The field includes ion storage materials, and in particular nanoscale ion storage materials useful in devices such as batteries.

2. Summary of Related Art

Ion storage materials are widely employed in storage batteries and other electrochemical devices. Various ion storage materials are known, including alkaline transition metal phosphates. This class of compounds typically has crystal specific gravity values of about 3 g/cm$^3$ to about 5 g/cm$^3$, and can crystallize in a number of structure types. Examples include ordered or partially disordered structures of the olivine ($A_xMXO_4$), NASICON ($A_x(M',M'')_2(XO_4)_3$), $VOPO_4$, $LiVPO_4F$, $LiFe(P_2O_7)$ or $Fe_4(P_2O_7)_3$ structure types, wherein A is an alkali ion, and M, M' and M'' are metals. Many such compounds have relatively low electronic conductivity and alkali ion conductivity, which are less than ideal for electrochemical applications. Many such compounds also exhibit limited solid solution range. For example, $LiFePO_4$ has been widely reported in the scientific literature to have an extremely limited range of solid solution at room temperature.

"Nanocrystalline" ion storage materials have been reported in the literature. For example, Prosini et al. in "A New Synthetic Route for Preparing $LiFePO_4$ with Enhanced Electrochemical Performance," *J. Electrochem. Soc.*, 149: A886-A890 (2002), describe $LiFePO_4$ of 8.95 m$^2$/g specific surface area as nanocrystalline. However, these materials, while somewhat improved, have not been of sufficiently small size scale to provide substantially different properties (e.g., near-theoretical capacity at high rates in excess of 5C) compared to their larger scale counterpart conventional ion storage materials.

SUMMARY

Nanoscale ion storage materials are provided that exhibit unique properties measurably distinct from their larger scale counterparts. For example, the disclosed nanoscale materials can exhibit increased electronic conductivity, improved electromechanical stability, increased rate of intercalation, and an extended range of solid solution.

In one aspect, a lithium transition metal phosphate material for use as an ion storage material is provided, including at least two co-existing phases, including a lithium-rich transition metal phosphate phase and a lithium-poor transition metal phosphate phase, wherein the percentage molar volume difference between the two phases is less than about 6.5%.

In one or more embodiments, the percentage molar volume difference between the two phases of the lithium transition metal phosphate material is less than about 6.40%, or less than about 6.25%, or less than about 5.75%, or less than about 5.5%.

In one or more embodiments, the at least two existing phases of the lithium transition metal phosphate material are crystalline and are defined by a unit cell having lattice parameters for each principal axis, and wherein the difference in lattice parameters for at least two principal axes of the unit cells are less than 3%.

In one or more embodiments, the difference in lattice parameters for all principal axes of the unit cells are less than 4.7%, or the difference in lattice parameters for all principal axes of the unit cells are less than 4.5%, or the difference in lattice parameters for all principal axes of the unit cells are less than 4.0%, or the difference in lattice parameters for all principal axes of the unit cells are less than 3.5%.

In one or more embodiments, the difference in the smallest product of lattice parameters for any two principal axes of lithium transition metal phosphate material is less than 1.6%, or the difference in the smallest product of lattice parameters for any two principal axes is less than 1.55%, or the difference in the smallest product of lattice parameters for any two principal axes is less than 1.5%, or the difference in the smallest product of lattice parameters for any two principal axes is less than 1.35%, or the difference in the smallest product of lattice parameters for any two principal axes is less than 1.2%, or the difference in the smallest product of lattice parameters for any two principal axes is less than 1.0%.

In one or more embodiments, the difference in the largest product of lattice parameters for any two principal axes of lithium transition metal phosphate material is greater than 4.7%, or the difference in the largest product of lattice parameters for any two principal axes is greater than 4.8%, or the difference in the largest product of lattice parameters for any two principal axes is greater than 4.85%.

According to one embodiment, the nanoscale materials have a plane formed by any of the principal axes of the crystal along which the strain measured as a change in the area is less than about 1.6%, or less than about 1.5%, or less than about 1.4%. According to another embodiment, none of the planes formed by any of the principal axes of the crystal have such a strain exceeding 8%, or 7.5%, or 6%.

In one or more embodiments, the lithium transition metal phosphate material has a specific surface area of at least about 20 m$^2$/g, or at least about 35 m$^2$/g, or at least about 50 m$^2$/g.

In one or more embodiments, the lithium transition metal phosphate material is selected from the group consisting of ordered or partially disordered structures of the olivine ($A_xMPO_4$), NASICON ($A_x(M',M'')_2(PO_4)_3$), $VOPO_4$, $LiVPO_4F$, $LiFe(P_2O_7)$ or $Fe_4(P_2O_7)_3$ structure types, wherein A is an alkali ion, and M, M' and M'' are transition metals.

In one or more embodiments, the lithium transition metal phosphate material has an overall composition of $Li_{1-x}MPO_4$, where M comprises at least one first row transition metal selected from the group consisting of Ti, V, Cr, Mn, Fe, Co and Ni, and wherein in use x ranges from 0 to 1. M can include Fe. The material can exhibit a solid solution over a composition range of 0<x<0.3, or the material exhibits a stable solid solution over a composition range of x between 0 and at least about 0.15, or the material exhibits a stable solid solution over a composition range of x between 0 and at least about 0.07 or between 0 and at least about 0.05 at room temperature (22-25° C.). The material can also exhibit a stable solid solution at low lithium content; e.g., where 1<x<0.8 or where 1<x<0.9, or where 1<x<0.95.

In one or more embodiments, the lithium-rich transition metal phosphate phase has the composition $Li_yMPO_4$ and the lithium-poor transition metal phosphate phase has the composition $Li_{1-x}MPO_4$, wherein $0.02<y<0.2$ and $0.02>x>0.3$ at room temperature (22-25° C.). In one or more embodiments, the material can exhibit a solid solution over a composition range of $0<x<0.15$ and $0.02<y<0.10$.

In one or more embodiments, the lithium transition metal phosphate material has an overall composition of $Li_{1-x}MPO_4$, where M comprises at least one first row transition metal selected from the group consisting of Ti, V, Cr, Mn, Fe, Co and Ni, and wherein in use x ranges from 0 to 1. M can include Fe. The material can exhibit a solid solution over a composition range of $0<x<0.3$, or the material exhibits a stable solid solution over a composition range of x between 0 and at least about 0.15, or the material exhibits a stable solid solution over a composition range of x between 0 and at least about 0.07 or between 0 and at least about 0.05 at room temperature (22-25° C.). The material can also exhibit a stable solid solution at low lithium content; e.g., where $0.8<x<0.8$ or where $0.9<x<1$ or where $0.95<x<1$.

In one or more embodiments, the lithium-rich transition metal phosphate phase has the composition $Li_yMPO_4$ and the lithium-poor transition metal phosphate phase has the composition $Li_{1-x}MPO_4$, wherein $0.02<y<0.2$ and $0.3>x>0.02$ at room temperature (22-25° C.). In one or more embodiments, the material can exhibit a solid solution over a composition range of $0<x<0.15$ and $0.02<y<0.10$.

In one or more embodiments, the lithium transition metal phosphate material is of a form selected from the group consisting of particles, agglomerated particles, fibers and coatings.

In one or more embodiments, the form has an average smallest cross-sectional dimension of about 75 nm or less, or about 60 nm or less, or about 45 nm or less.

In one or more embodiments, the lithium transition metal phosphate material is in the form of dispersed or agglomerated particles and the average crystallite size as determined by x-ray diffraction is less than about 800 nm, or less than about 600 nm, or less than about 500 nm, or less than about 300 nm.

In one or more embodiments, the form contains less than 3 wt % of a substantially non-lithium-storing conductive phase.

In one or more embodiments lithium transition metal phosphate material, the lithium transition metal phosphate material is crystalline or amorphous.

In one aspect of the invention, a cathode includes a lithium transition metal phosphate material, for example, a lithium transition metal phosphate material having an overall composition of $Li_{1-x}MPO_4$, where M comprises at least one first row transition metal selected from the group consisting of Ti, V, Cr, Mn, Fe, Co and Ni, and wherein in use x ranges from 0 to 1. The material can exhibit a solid solution over a composition range of $0<x<0.3$ or over a range of $0<x<0.15$. An electrochemical cell containing the electrode is also provided.

In one or more embodiments, the lithium transition metal phosphate material is crystalline or amorphous.

In another aspect of the invention, a lithium-deficient solid solution lithium transition metal phosphate is provided that is formed upon delithiation at a temperature below 150° C. having a specific surface area of at least about 25 $m^2/g$.

In one or more embodiments, the lithium transition metal phosphate is an ordered olivine structure, and the deficiency occurs on the lithium or M1 sites of the ordered olivine, or the disorder occurs on the lithium or M1 sites of the ordered olivine.

In another aspect of the invention, a lithium transition metal phosphate is provided that transforms upon first charge to disordered olivine having a lithium deficient solid solution and retains such solid solution at temperatures below 150° C., or at temperatures below 100° C., or at temperatures below 50° C.

Still another aspect provides a high power storage battery. The battery contains a cathode, an anode, an electrolyte in contact with and separating the anode and cathode, a cathode current collector in electronic communication with the cathode, and an anode current collector in electronic communication with the anode. The storage battery exhibits specific power of at least about 500 W/kg (1000 W/L) at specific energy of at least about 100 Wh/kg (205 Wh/L), and in some cases exhibits specific power of at least about 1300 W/kg (2500 W/L) at specific energy of at least about 90 Wh/kg (180 Wh/L). In certain embodiments, the battery cathode includes a nanoscale alkaline transition metal phosphate having a specific surface area of at least about 25 $m^2/g$. In some embodiments, the cathode includes particles, fibers or coatings of a nanoscale alkaline transition metal phosphate having an average smallest cross-sectional dimension of about 75 nm or less. In specific embodiments, the cathode includes a composition of formula $Li_{1-x}MPO_4$, where M is one or more transition metals. The composition has a specific surface area of at least about 25 $m^2/g$, and exhibits a stable solid solution over a composition range of x between 0 and at least about 0.03, and in some embodiments up to about 0.15. In particular embodiments, the cathode includes particles, fibers or coatings of a composition of formula $Li_{1-x}MPO_4$, where M is one or more transition metals. The particles, fibers or coatings have an average smallest cross-sectional dimension of about 75 nm or less, and the composition exhibits a stable solid solution at room temperature (22-25° C.) over a composition range of x between 0 and at least about 0.03, and in some embodiments up to 0.15.

BRIEF DESCRIPTION OF THE DRAWINGS

The following figures are presented for the purpose of illustration only, and are not intended to be limiting.

FIG. 1 is a transmission electron microscope image of a nanoscale lithium iron phosphate ion storage material illustrating nanoscale dimensions.

DETAILED DESCRIPTION

Figure 2B:
FIGS. 2A-2B show bright-field and dark-field scanning transmission electron microscope images, respectively, of an aggregated nanoscale lithium iron phosphate material.

Nanoscale ion storage materials and devices, such as storage batteries, that use these materials are provided. It has been unexpectedly discovered that ion storage materials having sufficiently small size scale and correspondingly high surface to volume ratio or specific surface area provide fundamentally different physical properties compared to their conventional coarse-grained counterparts. In particular, despite having gross structural similarities such as crystal structure type and basic atomic arrangements, upon preparation or during use the nanoscale materials are compositionally and structurally distinct from, and provide different and improved electrochemical utility and performance compared to, the coarse-grained materials. The difference in relevant physical properties arises because the nanoscale materials are sufficiently small in at least one dimension (for instance, the diameter of an equi-axed particle, the diameter of a nanorod, or the thickness of a thin film), or in 2- or 3-dimensions, that they have different defect chemical, thermodynamic, and mechanical properties. Nanoscale ion storage materials according to one or more embodiments, as described herein, exhibit outstanding electrochemical performance for use in primary or secondary storage batteries.

In particular, the nanoscale materials provide a very high rate capability, while providing a large fraction of the intrinsic charge capacity and energy density of the material. The different properties can be exhibited, for example, in an as-prepared state, upon being thermally equilibrated or partially thermally equilibrated (for instance by heating), or upon equilibrating with a gas phase or condensed phase medium, or upon being assembled and used as a bipolar electrochemical device, including undergoing repeated charge-discharge cycles.

Nanoscale ion storage materials can be crystalline (i.e., nanocrystalline) or amorphous. The unique properties discussed herein are believed to arise from the stresses created by free or internal surfaces or the behavior of the solid in the vicinity of a surface, and therefore the relevant nanoscale dimension is the separation between free or internal surfaces in the material. For example, for a particle that is a single crystallite or that is amorphous, the free surfaces define the cross-sectional dimensions that determine the nanoscale effects. For a particle composed of multiple crystallites, the free surfaces may again define the relevant cross-sectional dimensions, and if these are below the suitable size as described below, the material will exhibit nanoscale properties. The overall particle or aggregate size may exceed these cross-sectional dimensions, yet a crystallite within the aggregate may nonetheless have cross-sectional dimensions defined by the separation between an internal surface (e.g., a grain boundary) and an external surface of the aggregate that are sufficiently small to provide nanoscale properties. Such materials will be suitable for use in an electrochemical device wherein the crystallite has nanoscale properties and at least a portion of the crystallite has an external surface that is accessible to an electrolyte phase when the nanoscale material is used in the device.

The thermodynamically, mechanically, and electrochemically distinct properties described herein reflect a fundamental difference in nature of the nanoscale materials compared to larger scale materials, as opposed to simple or "trivial" size-scaling effects that may have been recognized previously in the art of battery materials. For example, the rate-capability of electrode materials can be limited at least in part by solid-state diffusion of ions in the storage compound. Under such circumstances, an increased rate capability is expected from the use of smaller particles, or thinner films (in the case of thin film batteries), because diffusion times are shorter and charge/discharge rates correspondingly faster for a given transport coefficient or diffusion coefficient. This simple effect of particle size is well-known in the battery field (see, e.g., U.S. Pat. No. 5,910,382, directed to LiFePO$_4$ as an electrode-active material; and Zhang et al. *Solid State Ionics* 171:25-31 (2004), relating to LiMn$_2$O$_4$), but in no way suggests that other physical properties of a reduced-scale material would fundamentally change at a certain size scale.

As another example, transport in electrochemical systems can be limited by surface reaction rates. A material having finer particle size and corresponding higher surface area will naturally have higher area available for surface reaction. This simple relationship again does not suggest a fundamental change in physical properties occurring at a particular size scale. However, the surface or interfacial chemistry of small scale materials can change due to their size, potentially causing a fundamental improvement in surface reaction rate that benefits rate capability apart from simple changes in available surface area. (See, e.g., Chiang, "Introduction and Overview: Physical Properties of Nanostructured Materials," *J. Electroceramics*, 1:205 (1997), for a discussion of unexpected differences between nanoscale materials and their coarse counterparts, as opposed expected differences based on well-known size-scaling laws.)

As described in more detail below, we have discovered unique behavior and phase composition at the nanoscale for ion storage materials based on alkali transition metal phosphates. Examples include nanoscale ordered or partially disordered structures of the olivine (A$_x$MPO$_4$), NASICON (A$_x$(M',M'')$_2$(PO$_4$)$_3$), VOPO$_4$, LiVPO$_4$F, LiFe(P$_2$O$_7$) or Fe$_4$(P$_2$O$_7$)$_3$ structure types, wherein A is an alkali ion, and M, M' and M'' are metals. Many such compounds have relatively low electronic conductivity and alkali ion conductivity when conventionally prepared, such that for electrochemical applications they benefit from unique properties arising from being in the nanoscale state.

In one or more embodiments, the nanoscale ion storage material has the formula LiMPO$_4$, where M is one or more transition metals. In certain embodiments, the nanoscale material is an ordered olivine (Li$_{1-x}$MXO$_4$), where M is one or more of V, Cr, Mn, Fe, Co and Ni, and x can range from zero to one, during lithium insertion and deinsertion reactions. In the as-prepared state, x is typically about one. In particular embodiments, the special properties of nanoscale ion storage materials may be augmented by doping with foreign ions, such as metals or anions. Such materials are expected to exhibit similar behavior to that demonstrated herein for Li$_{1-x}$FePO$_4$ at the nanoscale, based on the scientific principles underlying such behavior. However, doping is not required for a material to exhibit special properties at the nanoscale.

In other embodiments, there is some substitution of Li onto the M-site. In one embodiment, there is about 5 or 10% substitution of Li onto the Fe site. The lithium transition metal phosphate material has an overall composition of Li$_{1-x-z}$M$_{1-z}$PO$_4$, where M comprises at least one first row transition metal selected from the group consisting of Ti, V, Cr, Mn, Fe, Co and Ni, where x is from 0 to 1 and z can be positive or negative. M includes Fe, z is between about 0.15 and −0.15. The material can exhibit a solid solution over a composition range of 0<x<0.15.

Figure 2A:
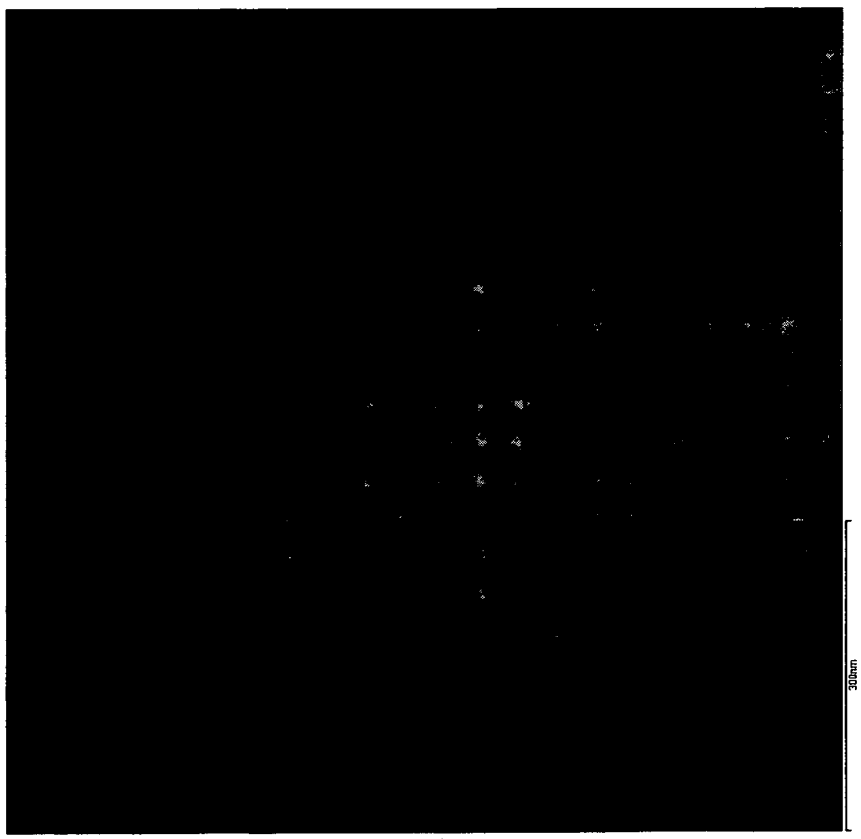
Figure 2E:
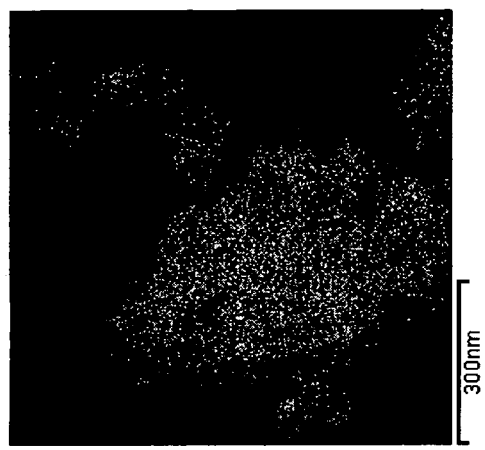
FIGS. 2C-F show Fe, P, O and C elemental maps taken on the sample in FIG. 2B.
Figure 2F:
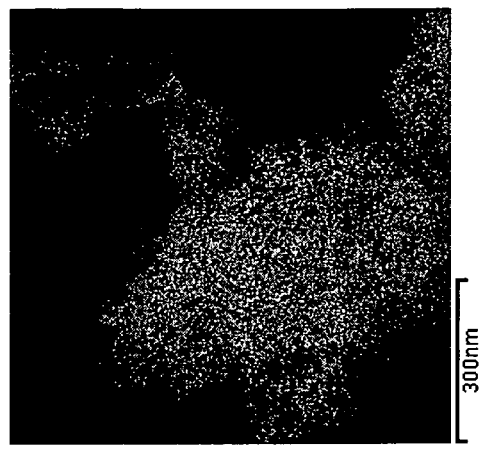
Figure 2C:
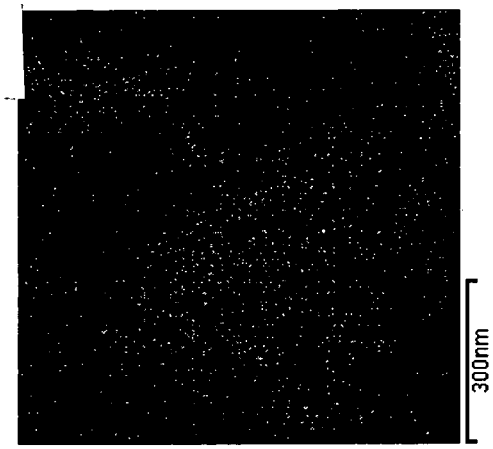
Figure 2D:
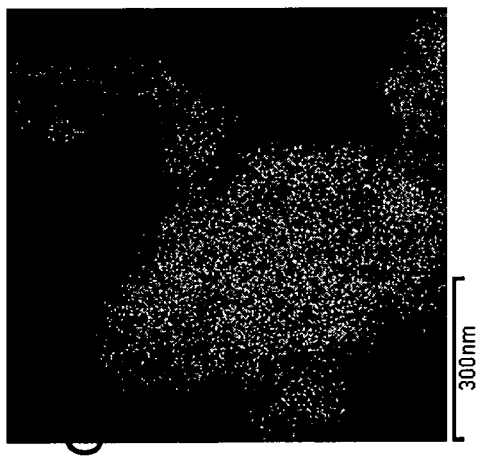

FIG. 1 is a transmission electron microscope image of a nanoscale lithium iron phosphate ion storage material exhibiting particle dimensions on these scales. FIGS. 2A and 2B show bright-field and dark-field scanning transmission electron microscope images, respectively, of an aggregated nanoscale lithium iron phosphate material. FIGS. 2C-2F show Fe, P, O and C elemental maps taken on the sample in FIG. 2A, showing that the distribution of these elements is uniform, i.e. that there are not distinguishable phases or particles rich in one or another of these main constituents.

These nanocrystalline form compositions will possess measurably distinct properties as described herein compared to their larger scale counterparts. For example, the nanoscale materials retain a greater extent of solid solution nonstoichiometry, namely, retain a higher defect content than the coarse-grained material. Such properties are measurable by electrochemical and crystallographic methods well-known to those skilled in the art. When used in electrodes for practical applications, such as a storage battery or other electrochemical device, the nanoscale ion storage materials provide higher charge storage at higher rates of charge or discharge than comparable materials that are not nanoscale.

The nanoscale dimensions that realize the benefits as described herein can be characterized by several methods. Based on results as described in the Examples below, the size-dependent nonstoichiometry and related beneficial properties of nanoscale LiFePO$_4$ and other ion storage compounds increase as the particle size decreases. These properties are significant, measurable, and beneficial at particle sizes below that corresponding to a BET specific surface area of about 20 m$^2$/g. In some instances, materials having a BET specific surface area of at least about 25 m$^2$/g, for example, at least about 30 m$^2$/g, at least about 35 m$^2$/g, at least about 40 m$^2$/g, at least about 45 m$^2$/g, or at least about 50 m$^2$/g are employed. As used herein, "the BET method" refers to the method of Brunauer, Emmett and Teller, well-known to those skilled in the art of powder characterization, in which a gas phase molecule (such as N$_2$) is condensed onto the surfaces of a material at a temperature (such as 77 K) where the coverage of condensed gas per unit area is well-known, and the total amount of condensed gas on the sample is then measured upon being liberated by heating.

For a given value of the BET specific surface area, and knowing the specific gravity of the material, it is also possible to calculate a corresponding "equivalent spherical particle size." This is the particle diameter that would result in the measured surface area if the material were in the form of identically-sized spherical particles, and is a good approximation of the number-averaged or mean particle size if the particle shape is equi-axed. The particle morphology of the nanomaterials described in certain of the Examples below is nearly spherical, and the equivalent spherical particle size calculated from the BET specific surface area is very close to the average particle diameter directly observed by electron microscopy. Furthermore, the size of crystallites or primary particles, when the materials of the invention are crystalline, can be determined by X-ray line-broadening methods well-known to those skilled in the art. Thus, in certain embodiments, the nanomaterials described herein have an average (i.e., mean) diameter of about 100 nm or less. In some instances, the average diameter is about 75 nm or less, for example, about 70 nm or less, about 60 nm or less, about 50 nm or less, about 45 nm or less, about 40 nm or less, or about 35 nm or less.

The unique properties of a nanomaterial may depend on the smallest cross-sectional dimension. Cross-sectional dimension is here understood to be that family of straight lines that can be drawn through the center of mass of an isolated or separable object. By assuming spherical morphology, the equivalent spherical particle size gives the largest average cross-sectional dimension of a particulate material. On the other hand, a very thin but continuous film, or a very thin but continuous fiber, can exhibit nanoscale effects, even though the dimensions are far larger than nanoscale in the plane of the film or along the axis of the fiber. However, if the smallest cross-sectional dimension, namely the thickness of the film or the diameter of the fiber, is sufficiently small, nanoscale properties may be obtained. Thus, in certain embodiments, for anisometric particles, such as nanorods, nanoplatelets, nanofibers or continuous thin films, the specific surface area and the equivalent spherical particle size may not adequately define the characteristic dimension below which the nanomaterial will exhibit special properties. That is, for highly anisometric particle shapes, in some instances the BET surface area can be larger than the above-mentioned values, yet the material still will exhibit a smallest characteristic dimension sufficiently small to exhibit nanoscale properties as described herein.

If particle morphology is well-known and uniform amongst particles in a sample (for instance, if the average size and aspect ratio of nanorods or nanoplatelets is known, or even if the distribution of such parameters is known), a specific surface area above which nanoscale behavior will be observed can be computed for a given particle shape. However, for simplicity, in at least some such embodiments, nanoscale behavior will be observed if the primary particles of the powder exhibit a smallest cross-sectional dimension that is, on a number-averaged basis to provide a mean value, about 100 nm or less. In some instances, the smallest cross-sectional dimension about 75 nm or less, for example, about 70 nm or less, about 60 nm or less, about 50 nm or less, about 45 nm or less, about 40 nm or less, or about 35 nm or less. These dimensions can be measured using various methods, including direct measurement with an electron microscope of the transmission or secondary-electron type, or with atomic force microscopy. Herein, a primary particle dimension is considered to be the characteristic spatial dimension that a BET surface area measurement would interrogate by adsorbing gas onto exposed surfaces of the material. In the instance of a substantially fully-dense polycrystalline aggregate, it is the dimension of that aggregate. In the case of well-dispersed individual crystallites, it is the crystallite dimension. In the case of particles joined into a sintered network or a porous assembly of the particles, it is the cross-sectional thickness of the branches of the network, or the mean separation between pores that are open to the exterior of the assembly. In the case of an aggregated powder, the agglomerate may have an average crystallite size of less than about 800 nm, or less than about 600 nm, or less than about 500 nm, or less than about 300 nm. In some embodiments, the nanoscale material is a thin film or coating, including a coating on a particle of any size, in which the film or coating has an average thickness of about 100 nm or less, in some cases about 75 nm or less, for example, about 70 nm or less, about 60 nm or less, about 50 nm or less, about 45 nm or less, about 40 nm or less, or about 35 nm or less. The thickness of the film or coating can be measured by various methods including transmission electron microscopy or other microscopy methods that can view the film or coating in cross-section.

In certain embodiments, the nanoscale ion storage materials described herein are prepared from conventional materials by size-reduction processes (e.g., milling) to reduce the particle dimensions into the desired range. However, this can be a highly energy-intensive process. Thus, as illustrated in the Examples below, the materials also can be synthesized in the nanoscale state, by methods including, but not limited to, solid-state reactions between metal salts, wet-chemical methods, such as co-precipitation, spray-pyrolysis, mechanochemical reactions, or combinations thereof. Nanoscale materials with the desired particle sizes and specific surface areas are obtained by homogeneous reactants, minimizing the reaction or crystallization temperature (in order to avoid particle coarsening), and avoiding formation of liquid phases in which the product is highly soluble (which also tends to lead to particle coarsening). Specific processing conditions can typically be established for a given process without undue experimentation by those skilled in the art.

In some embodiments, nanoscale ion storage materials are prepared by non-equilibrium, moderate temperature techniques, such as wet-chemical or low temperature solid-state reactions or thermochemical methods. The materials thus prepared can acquire properties such as increased nonstoichiometry and disorder and increased solubility for dopants because they are synthesized in a metastable state or because kinetic pathways to the final product differ from those in conventional high temperature processes. Such disorder in the nanoscale form can also be preserved substantially under electrochemical use conditions and provide benefits as described herein.

Until the present experimental results were obtained, it was not known if nanoscale ion storage materials would exhibit fundamentally different physical properties compared to their coarse-grained counterparts, nor was it known what measurable physical properties would differ, nor the size scale that would realize these differences. Useful and advantageous characteristics of nanoscale ion storage materials according to certain embodiments include, but are not limited to, the following.

The materials can exhibit increased electronic conductivity, for example, due to the co-existence in solid solution of higher concentrations of mixed-valence transition metal ions, or changes in the electronic structure related to a closer separation between atomic orbitals providing higher electronic carrier mobility, or both. Typically, the improved electronic conductivity will have a value greater than about $10^{-8}$ S/cm.

The materials can have improved electromechanical stability, such as improved resistance to fracture, due to suppressed or delayed phase transformations during use as a storage electrode. This can allow higher energy, higher rate capability, and longer life of the materials and electrochemical cells using the materials. When electrochemical cycling causes phase transformations, the materials also may exhibit smaller molar volume differences between phases, which contributes to more facile transformation between the phases upon insertion and deinsertion of lithium.

In compounds where ion diffusion has reduced dimensionality, for example, being one-dimensional (along channels) or two-dimensional (along planes) in the crystal structure, the nanoscale material can exhibit increased rate of intercalation, due to the existence of multiple paths out of the particle when there may be blocking immobile ions in the diffusion paths. The diffusion coefficient should be a materials property, not size dependent unless something else changes such as structure or disorder. This phenomenon is illustrated as follows. A particle that is 100 unit cells wide in spatial dimension, assuming each unit cell contains one formula unit of the compound, can have 1% disorder and have only, on average, one disordered atom blocking a given diffusion channel. This will have little impact on diffusion of ions into and out of the particle, since the diffusion channel can be accessed from both ends. In contrast, for a much larger particle having the same degree of disorder, the blocking ions will prevent access to the majority of the channel. The specific value of the chemical diffusion coefficient of the transported ion (e.g., Li in a lithium battery) can be improved by the additional disorder of a nanoscale material, typically to a value greater than about $10^{-16}$ cm$^2$/sec.

These observed properties provide an ion storage material with increased charge storage at higher charge and discharge rates.

Nanoscale ion storage materials as described herein differ from their larger scale counterparts in the composition range in which they can stably exist. In at least some embodiments, the nanoscale compound can exist in a state of extended solid solution compared to the coarse-grained compound at the same temperature. The existence of solid-solution nonstoichiometry is important for improving ion and electron transport, as has been demonstrated in numerous ion-intercalation compounds One aspect of the invention provides a nanocrystalline composition exhibiting a much wider range of solid solution or defect content at a given temperature than a bulk crystal or coarse powder of nominally similar composition and crystalline phase before phase-separating into two or more phases. These features are described in particular detail for $Li_{1-x}FePO_4$, however, it will be apparent to those of skill in the art that application of these principals to other ion storage materials will provide similar results.

As a non-limiting example, the conventional compound $Li_{1-x}FePO_4$ is known to exhibit negligible solid solution nonstoichiometry x at room temperature, x being about 0.002 according to some published literature (Delacourt et al., "Two-phase vs. one-phase $Li^+$ extraction/insertion mechanisms in olivine-type materials," Abstract 200, 207$^{th}$ Meeting of The Electrochemical Society, Quebec City, Calif., May 15-20, 2005; Delacourt et al., "The existence of a temperature-driven solid solution in $Li_xFePO_4$ for $0 \leq x \leq 1$," *Nature Materials*, 4:254-260 (2005)), about 0.0475 in another publication (V. Srinivasan and J. Newman, *Journal of the Electrochemical Society*, 151:A1517-A1529 (2004), and about 0.038 in another publication (A. Yamada, H. Koizumi, N. Sonoyama and R. Kanno, *Electrochemical and Solid State Letters*, 8:A409-A413 (2005). The concentration of lithium that is tolerated in the delithiated compound $Li_yFePO_4$, with which $Li_{1-x}FePO_4$ coexists, is even less. These features are illustrated in the composition-temperature phase diagram for $LiFePO_4$—$FePO_4$, shown in FIG. 3A. The phase composition for an iron phosphate with varying levels of lithium will vary with temperature, and a solid solution exists over wider ranges of lithium concentration at elevated temperatures, e.g., above 150° C. Elevated temperatures are not practical for most ion storage applications and practical applications are constrained to be only slightly elevated above room temperatue, e.g., less than about 100° C. Unless otherwise stated, we refer to compositions at a temperature below about 100° C. and typically at room temperature (22-25° C.).

Figures 3A, 3B:
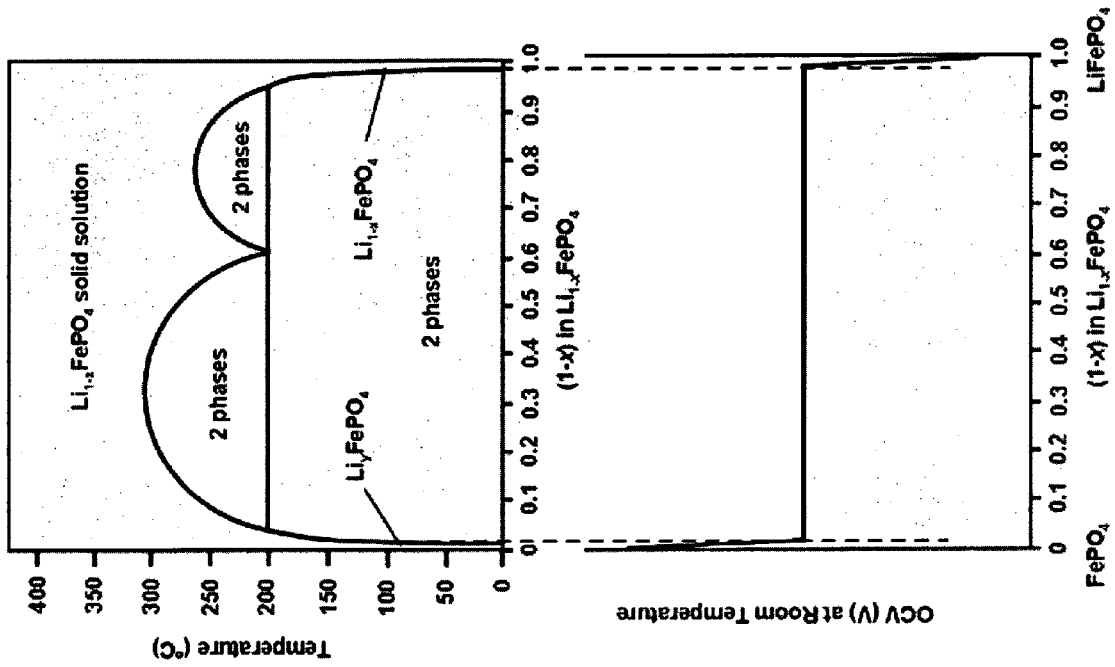
FIG. 3A is a composition-temperature phase diagram for a conventional $Li_{1-x}FePO_4$ ion storage material according to certain embodiments.
FIG. 3B is a voltage vs composition graph for a conventional or coarsened $Li_{1-x}FePO_4$ material.

The phase diagram in FIG. 3A shows that at this temperature range, the solid solution ranges are extremely limited. An illustrative voltage vs. composition plot at room temperature for the ion storage material is shown in FIG. 3B and demonstrates that the voltage curve is flat over most of the compositional range, indicating the presence of a two phase system over almost the entire lithium composition range. In $Li_{1-x}FePO_4$ of a conventional coarse-grained form, the absence of solid solution nonstoichiometry is manifested by decomposition of lithium deficient compositions into two highly stoichiometric compounds having a chemical composition approach that of the end group compositions, $LiFePO_4$ and $FePO_4$. Both of these compounds have low electronic conductivity, due at least in part to the existence of nearly a single iron valence state, $Fe^{2+}$ and $Fe^{3+}$ respectively, in the individual crystallites. In nearly stoichiometric $LiFePO_4$, the lithium diffusion coefficient is likely also very low, due to the absence of lattice vacancies to facilitate Li transport.

Figures 4A, 4B:
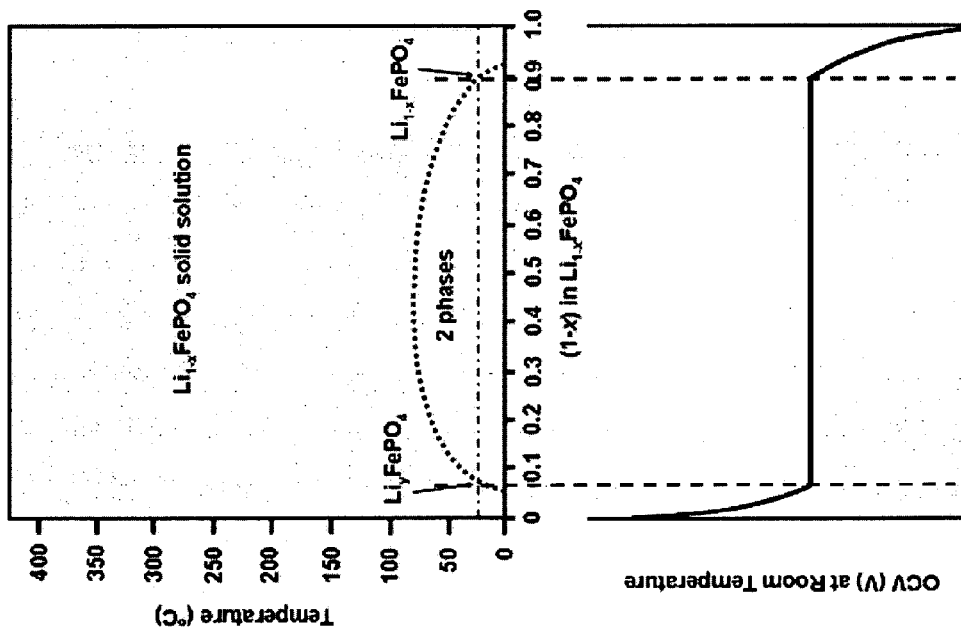
FIG. 4A is a composition-temperature phase diagram for a nanoscale $Li_{1-x}FePO_4$ ion storage material according to certain embodiments of the invention demonstrating an extended region in which solid solution is formed.
FIG. 4B is a voltage vs composition graph for a conventional or coarsened $Li_{1-x}FePO_4$ material; the nanocrystalline form behaves thermodynamically and electrochemically as a distinct material from the conventional or coarsened crystalline state.

In contrast, nanocrystalline $Li_{1-x}FePO_4$ and $Li_yFePO_4$ having a specific surface area measured by the BET method of greater than about 20 m$^2$/g, and in some instances greater than about 30 m$^2$/g, has been found to exhibit x (and y) that are severalfold larger than in the conventional compound. Indeed at room temperature, $Li_{1-x}FePO_4$ can exhibit x as large as 0.05, 0.07, 0.10, 0.15, 0.3 or even greater and y can be as large as 0.05 or 0.1 or 0.2. As illustrated in FIG. 4A, the dashed lines shows the existence of a significant solid solution at temperatures of less than about 50° C. for $Li_{1-x}FePO_4$ and $Li_yFePO_4$. An illustrative voltage vs. composition plot at room temperature for the ion storage material is shown in FIG. 4B. The curve has a demonstrably smaller flat region, indicating that the compositional range of a two-phase system is limited. The sloping regions that flank the flat region indicate the existence of a solid solution. The solid solution end-limits for the two endmember phases coexisting in the nanoscale material are larger than for the conventional material. For instance, in $LiFePO_4$ this means having a large lithium deficiency x in the lithium-rich $Li_{1-x}FePO_4$ endmember, and a large lithium excess y in the lithium-deficient endmember $Li_yFePO_4$, the ideal limiting compositions of these two co-existing phases being $LiFePO_4$ and $FePO_4$ respectively. Thus, during electrochemical cycling, the co-existing phases include a large extent of nonstoichiometry. The higher degree of nonstoichimetry indicates a greater population of both $Fe^{2+}$ and $Fe^{3+}$ at every point within the two-phase region, which provides higher electronic conductivity for the material. In addition, the sloping voltage curve of the nanophosphate permits the functional advantage of allowing state-of-charge monitoring that is not possible or is more difficult and expensive to conduct with materials exhibiting a flat two-phase discharge voltage profiles.

Improved electron and ion transport rates are well-known to improve the rate capability of ion storage materials used in battery technology. In certain lithium transition metal phosphate compounds described herein, both electron and ion transport rates are slow compared to that in some previously used materials (such as $LiCoO_2$ or $LiMn_2O_4$), and those skilled in the art have sought methods by which such transport can be improved. Nanoscale lithium transition metal phosphate compounds exhibit retention of solid-solutions at various states of charge (lithium concentration), and the resulting materials exhibit high rate capability and high energy that have not previously been attainable in these materials.

The nonstoichiometry of non-alkali elements in the subject materials also can vary in the nanocrystalline form. The fundamentally different phase behavior applies to each of the components of the compositional system, although likely to different degrees. Other aspects of atomic level disorder likely also are affected at nanoscale dimensions. For example, in $Li_{1-x}FePO_4$, the site occupancy of the M1 and M2 sites of the ordered olivine structure, occupied solely by Li and Fe in the ideal crystal, can vary in the nanoscale material. There can be disorder or mixing of the Li and Fe cations between the two sites, and vacancy defects can appear on one or both sites. Also, solute cations (dopants) can be more soluble in the nanocrystalline material, or can occupy different sites than they do in the conventional material. In the nanocrystalline state, nonstoichiometry on the oxygen sublattice of the crystal structure also can occur. The solubility of foreign anions, such as sulfur or halogens, can increase as well. In certain embodiments, nanoscale ion storage materials as described herein exhibit one or more of these variations in defect or solid solution behavior. However, as shown by experimental results presented herein, the presence of foreign metals or anions is not necessary to create or define the special properties of the nanocrystalline state.

Differences in physical properties exhibited by the nanoscale materials according to one or more embodiments of the insertion compared to their conventional coarse-grained counterparts are readily measurable by standard thermal and electrochemical techniques, such as calorimetry, cyclic voltammetry, galvanostatic intermittent titration (GITT), or potentiostatic intermittent titration (PITT). The improved performance of the nanoscale materials in ion storage applications is also readily measurable, for example, by formulating the nanoscale material into an electrode coating, constructing a nonaqueous electrochemical cell, and performing charge-discharge tests at various current rates.

The state of extended solid solution in the nanoscale material can be confirmed using electrochemical methods. For example, a compound of nanocrystalline $Li_{1-x}FePO_4$ can be tested in a nonaqueous electrochemical cell. The nanocrystalline $Li_{1-x}FePO_4$ serves as the positive electrode against a source of lithium having a total lithium content much greater than the lithium storage capacity of the nanocrystalline electrode, such as lithium foil. This electrochemical cell construction is often referred to as a lithium half-cell by those skilled in the art of lithium-ion batteries. In such a cell, the nanoscale ion storage material is formulated into an electrode, typically using a conductive additive, such as carbon, and a polymeric binder. The nanoscale ion storage material electrode is separated from the lithium metal counterelectrode, typically by a microporous polymer separator. The cell is then infused with a nonaqueous lithium-conducting liquid electrolyte. The charge and discharge rates of the electrode are sufficiently fast that the electrochemical behavior of the nanoscale material can be tested.

Differences in physical properties exhibited by the nanoscale materials according to one or more embodiments of the invention compared to their conventional coarse-grained counterparts are readily measurable by standard thermal and electrochemical techniques, such as calorimetry, cyclic voltammetry, galvanostatic intermittent titration (GITT), or potentiostatic intermittent titration (PITT). The improved performance of the nanoscale materials in ion storage applications is also readily measurable, for example, by formulating the nanoscale material into an electrode coating, constructing a nonaqueous electrochemical cell, and performing charge-discharge tests at various current rates.

Figure 5:
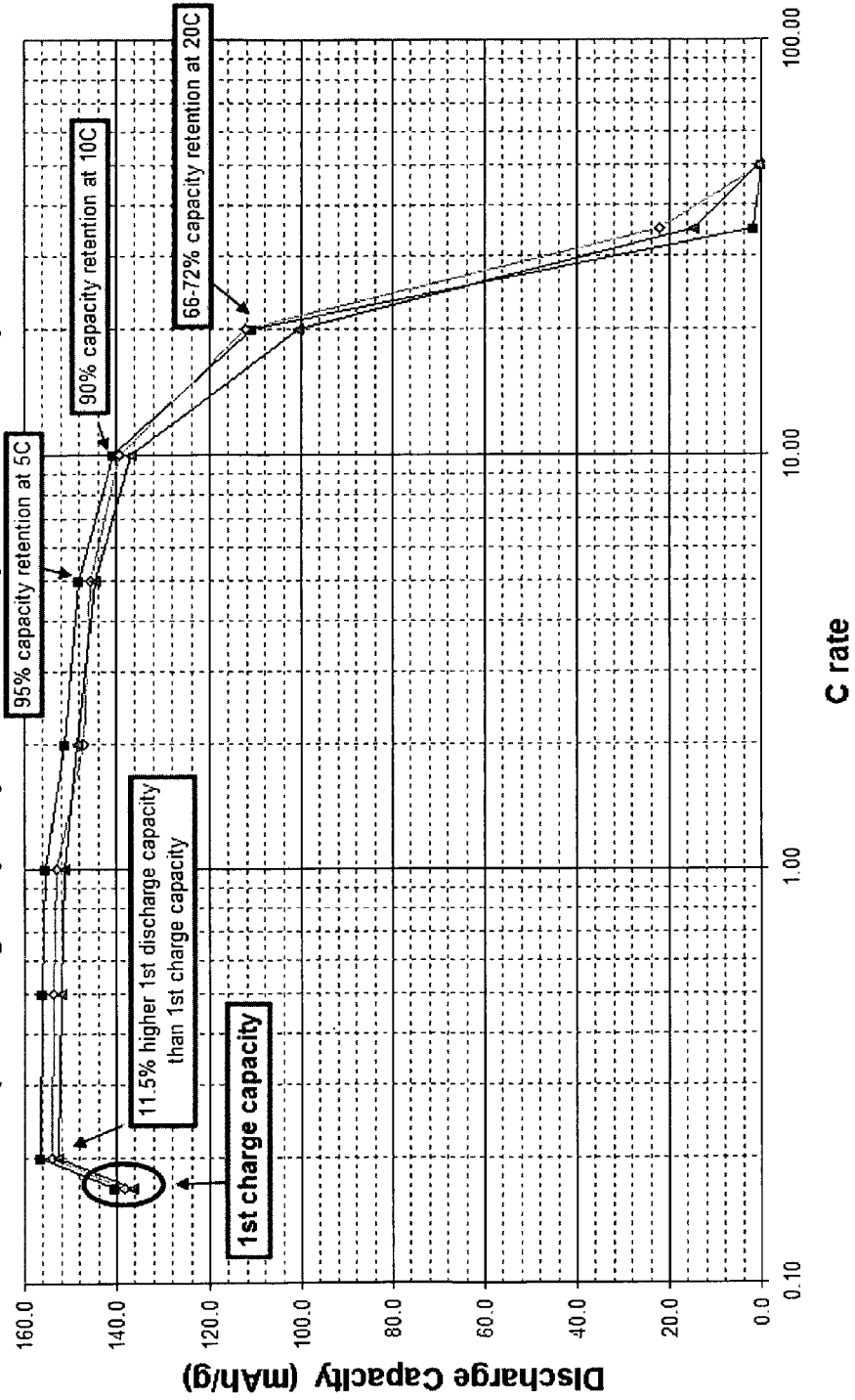
FIG. 5 is a plot of discharge capacity at various C-rates for the nanoscale lithium iron phosphate of Example 2; the plot includes the initial first charge capacity and illustrates that the first discharge capacity is more than 10% higher than the first charge capacity.
Figure 6:
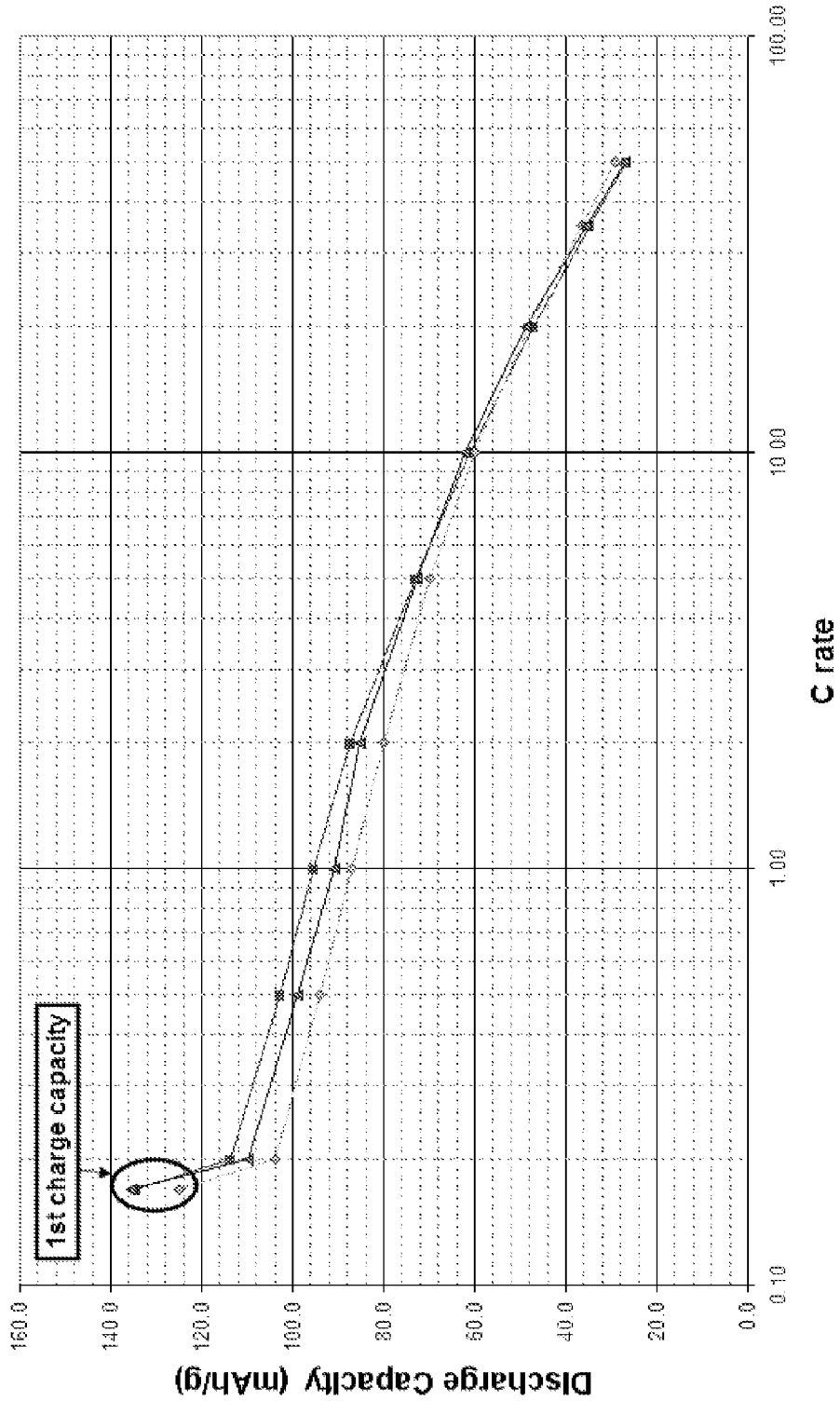
FIG. 6 is a plot of discharge capacity at various C-rates for a conventional coarse grained lithium iron phosphate; the material exhibits conventional first charge and discharge behavior and the plot shows a decrease in first discharge capacity compared to first charge capacity.

This behavior observed for nanocrystalline lithium iron phosphate is strikingly different from that of a conventional or coarse $LiFePO_4$, and indeed that of most insertion electrode materials. Such materials typically exhibit a first-charge capacity that is greater than the first- and subsequent discharge capacities using a similar cell configuration. Results from one comparative example are shown in FIG. 6. Comparison of this conventional material to the nanoscale material in FIG. 5 highlights some striking differences. First, discharge capacity at C/5 decreases by more than 10% from first charge capacity and the discharge capacity decreases steadily with increasing discharge rate.

The advantages imparted by a nanoscale material according to one or more embodiments of the present invention are counter-intuitive because a high, initial charge capacity is typically associated with a greater extractable lithium content. While it is generally desirable for a lithiated electrode material to have a higher initial extractable lithium content, in the present instance the ability of the nanoscale material to sustain a lithium-deficient solid solution confers various advantages as described herein, which may overcome the disadvantage of having slightly less lithium capacity.

Moreover, as discussed later, the nanoscale materials of the invention can sustain a nonstoichiometry x and y in the coexisting phase that may be as large or larger than the nonstoichiometry present in the as-made material. Thus preparation in an initially nonstoichiometric state is not required of the materials of the invention, nor necessary in order to obtain the benefits described herein.

The ability of nanocrystalline materials as described herein to exist in a more highly nonstoichiometric or defective state than their coarse counterparts also can be demonstrated by measuring the equilibrium or near-equilibrium electrical potential of a nanoscale material relative to a standard or reference electrode in an electrochemical cell that allows electrochemical equilibration. It is well-known to those skilled in the art that the equilibrium electrical potential of such a cell, having one electrode whose potential is suitably well-referenced, can be used to determine the chemical potential of an electroactive species in the other, test electrode.

Figure 7:
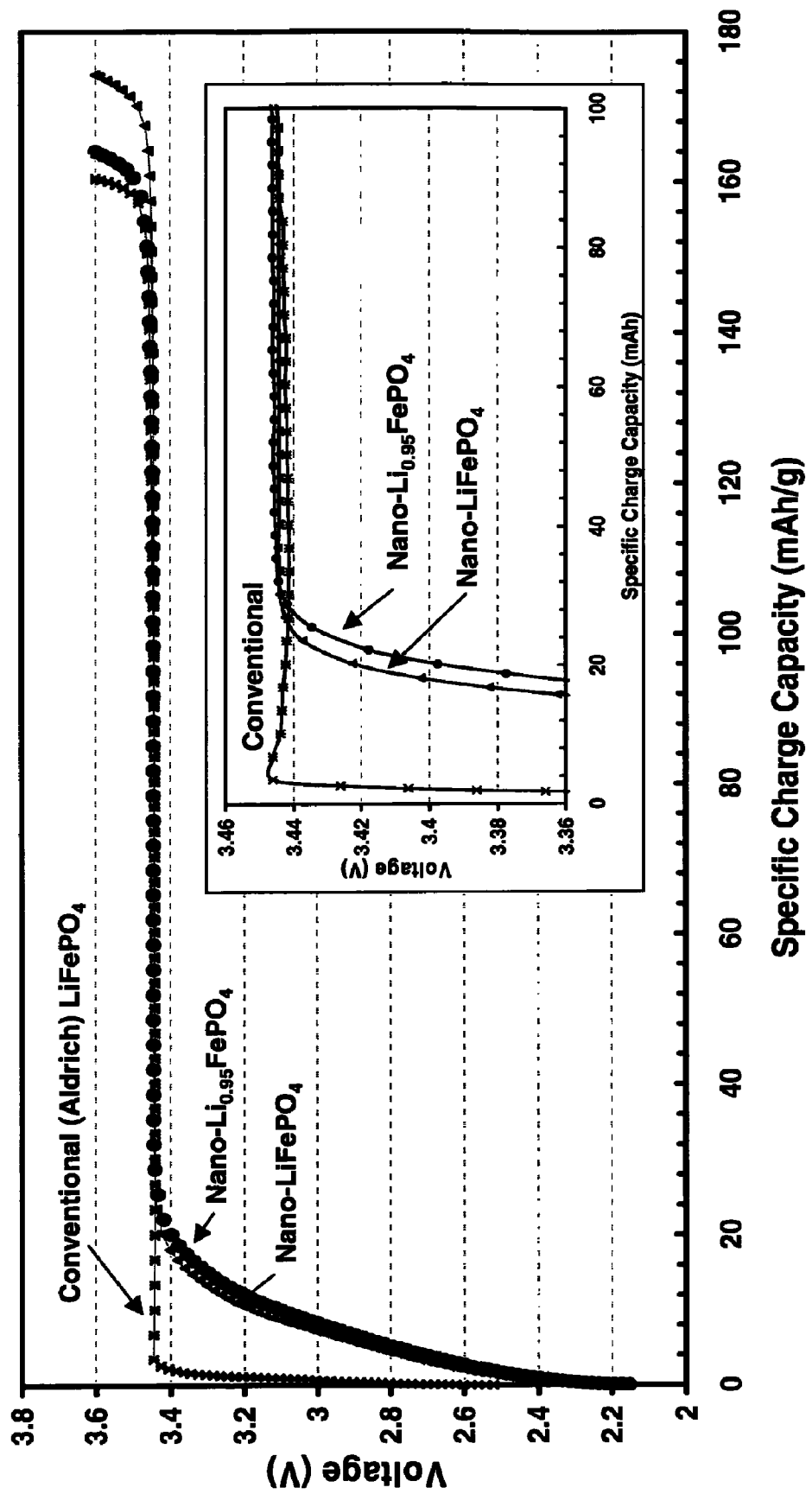
FIG. 7 is a plot illustrating the equilibrium or near-equilibrium electrical potential of a nanoscale $Li_{1-x}FePO_4$ ion storage material at a nearly fully lithiated composition, according to certain embodiments, relative to a standard or reference electrode in an electrochemical cell that allows electrochemical equilibration; an extended range of solid solution at room temperature in the nanoscale material is shown by a range of charge capacity, corresponding to regions of composition x, over which the open-circuit-voltage (OCV) varies continuously with composition, rather than being at a constant OCV.

FIG. 7 shows the cell voltage vs. specific capacity of the positive electrode active material for cells in which a lithium metal counterelectrode has been used, serving as a suitable reference. Two nanoscale lithium iron phosphate materials of overall compositions $LiFePO_4$ and $Li_{0.95}FePO_4$ are compared against a conventional, commercially available carbon-coated lithium iron phosphate. All three cells are tested at a slow C/50 rate permitting the near-equilibrium cell voltage to be observed. The nanoscale materials are further known from separate tests to exhibit much faster relaxation to their equilibrium potentials than does the conventional sample. It is seen that the nanoscale materials exhibit a substantial charge capacity over which the voltage varies continuously, before reaching a relatively constant voltage plateau. In contrast, the cell voltage for the conventional material exhibits no such regime, instead reaching its voltage plateau nearly immediately after a small voltage overshoot.

Figure 8:
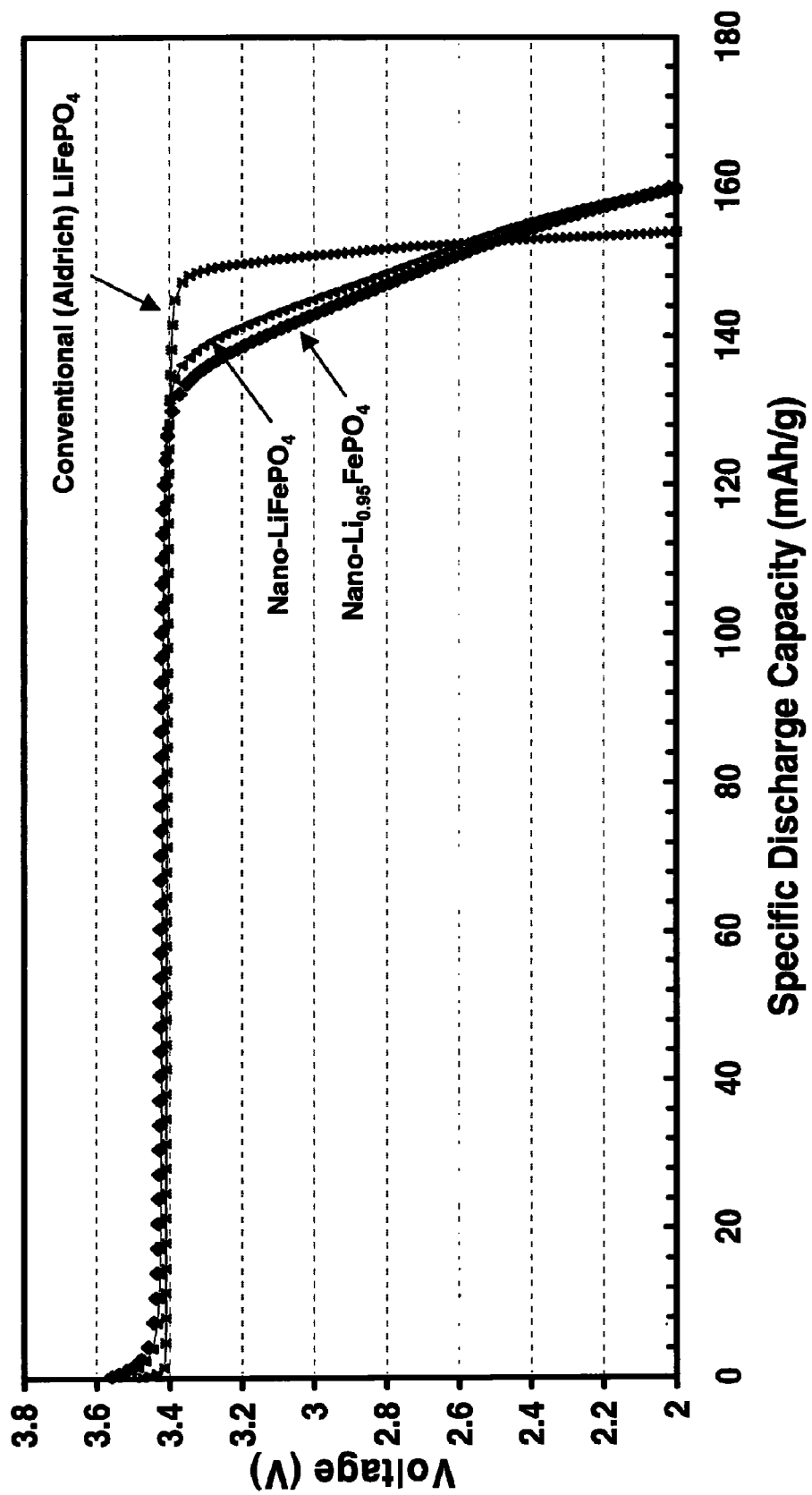
FIG. 8 is a plot illustrating the equilibrium or near-equilibrium electrical potential of a nanoscale $Li_yFePO_4$ ion storage material at a nearly fully delithiated composition, according to certain embodiments, relative to a standard or reference electrode in an electrochemical cell that allows electrochemical equilibration; an extended range of solid solution at room temperature in the nanoscale material is shown by a range of charge capacity, corresponding to regions of composition x, over which the open-circuit-voltage (OCV) varies continuously with composition, rather than being at a constant OCV.

FIG. 8 shows the C/50 discharge curves for the same three samples. Here it is seen that at the beginning of discharge the nanoscale materials both exhibit a capacity regime of continuously varying voltage, indicating the existence of a solid solution, that is essentially absent for the conventional material, and at the end of discharge, both nanoscale materials exhibit a wide capacity regime of continuously varying voltage indicating a solid solution. These examples demonstrate the effect pictorially illustrated in FIGS. 3B and 4B for nanoscale and conventional lithium iron phosphate materials, respectively.

Other accepted electrochemical methods that can be used to show that the nanoscale materials of the invention possess regimes of extended solid solution include GITT and PITT. In GITT, the open-circuit-voltage (OCV) measured after allowing an electrochemical cell to approach equilibrium will exhibit a composition dependence (i.e., as a function of state-of-charge or charge capacity) that is measurably different between the conventional and nanocrystalline forms. An extended range of solid solution in the nanoscale material is shown by regions of composition x over which the OCV varies continuously with composition, rather than being at a constant OCV. This indicates a constant chemical potential for lithium despite variation of x, corresponding to a multiphase equilibrium. Such measurements typically can be conducted to ±0.002V or better precision by those skilled in the art, allowing comparison of different materials to determine the value of x at which the boundary between a single-phase solid solution and multiple phases lies. For a nanoscale material, there is a wider range of composition x over which the single-phase solid solution can exist. The wider range of solid solution in the nanoscale form can be attained for any one or more of the individual phases exhibited by the compound, including intermediate phases forming within the limits of lithiation discussed here.

Figure 9:
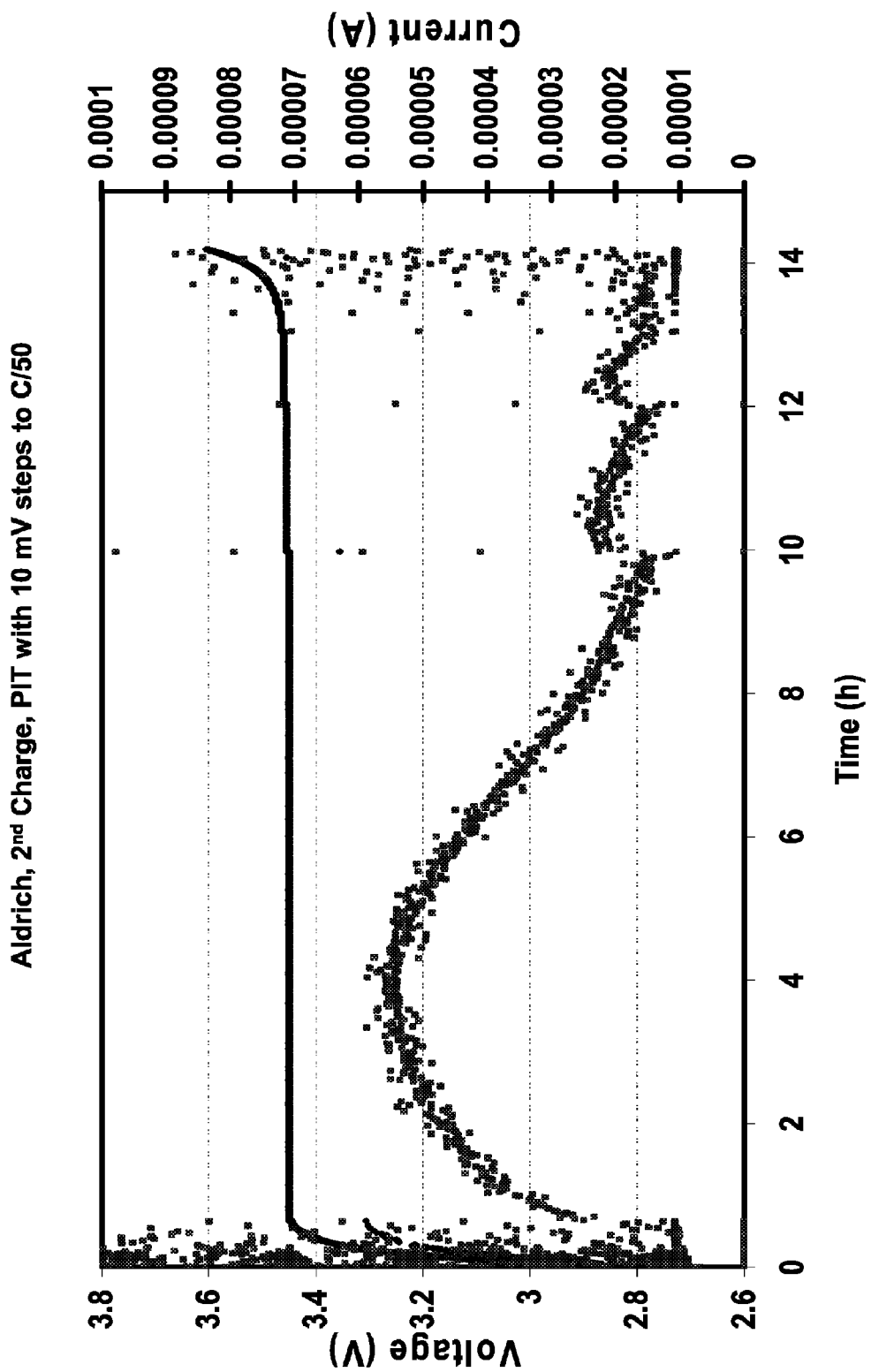
FIG. 9 shows the voltage and current traces upon charging in a PITT measurement of a conventional carbon-coated lithium iron phosphate sample.
Figure 10:
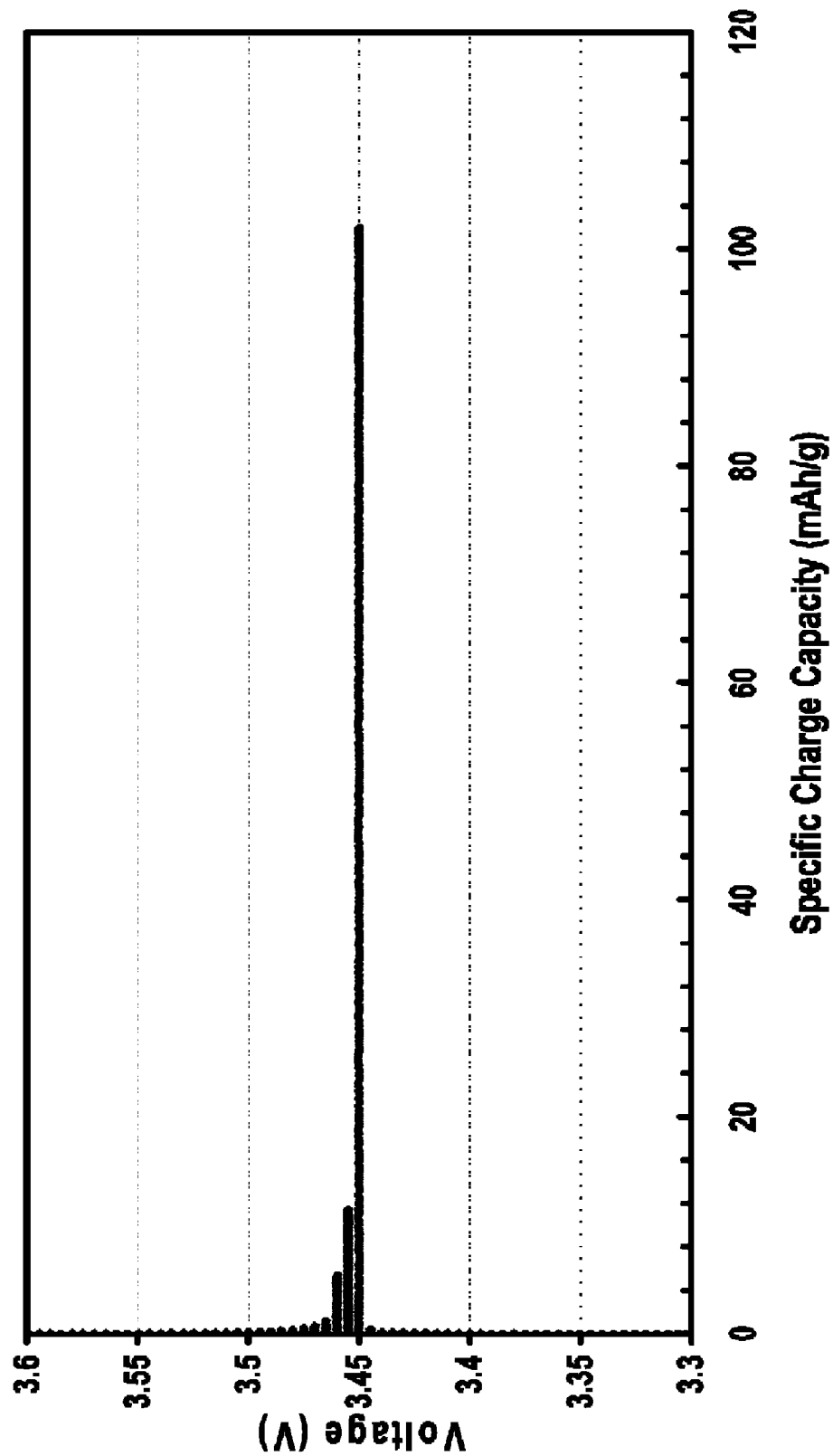
FIG. 10, shows the capacity the cell of FIG. 9 at each voltage step during the PITT charging experiment; virtually no capacity is recorded as the voltage is raised until a large capacity is observed at the plateau voltage.
Figure 11:
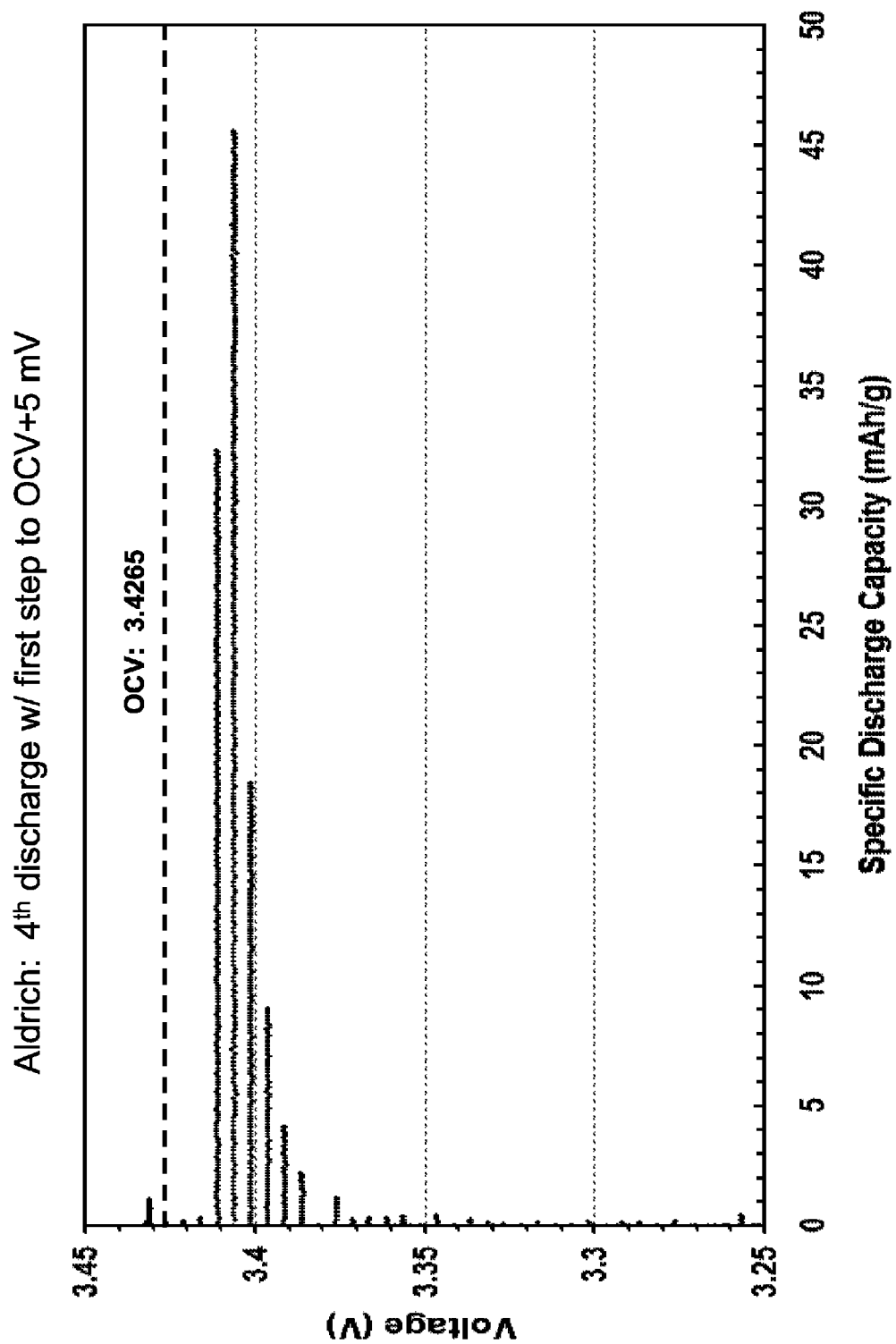
FIG. 11 illustrates a PITT discharging experiment for the cell of FIG. 9 in which the first voltage step was from a charge voltage of 3.8V to a voltage that is 5 mV above the open-circuit voltage of the cell, measured at a 50% state-of-charge; virtually no discharging of the cell is seen until the PITT voltage is about 20 mV below the OCV.

The PITT method is also useful for not only determining the cell voltages at which electrochemical oxidation and reduction of an electrode-active compound occur, but also for providing information regarding the rate and mechanism of such reactions. In PITT, the cell voltage is stepped upwards or downwards incrementally, and the current flow is monitored as the cell spontaneously charges or discharges. FIG. 9 shows the voltage and current traces upon charging in a PITT measurement of a conventional carbon-coated lithium iron phosphate sample. With each incremental voltage step of 10 mV, the current is observed to flow as the cell undergoes charging. It is notable that virtually no capacity is recorded until a voltage plateau is reached. Also, during charging on the voltage plateau, the current flow rises slowly over a period of several hours and then decays, showing sluggish kinetics for the phase transformation occurring during charging. In FIG. 10, the capacity measured for the cell at each voltage step during the PITT charging experiment is shown. It is seen that virtually no capacity is recorded as the voltage is raised until a large capacity is observed at the plateau voltage. In FIG. 11 are shown results for the same cell during a PITT discharging experiment in which the first voltage step was from a charge voltage of 3.8V to a voltage that is 5 mV above the open-circuit voltage of the cell, measured at a 50% state-of-charge. In this experiment, virtually no discharging of the cell is seen until the PITT voltage is about 20 mV below the OCV.

Figure 12:
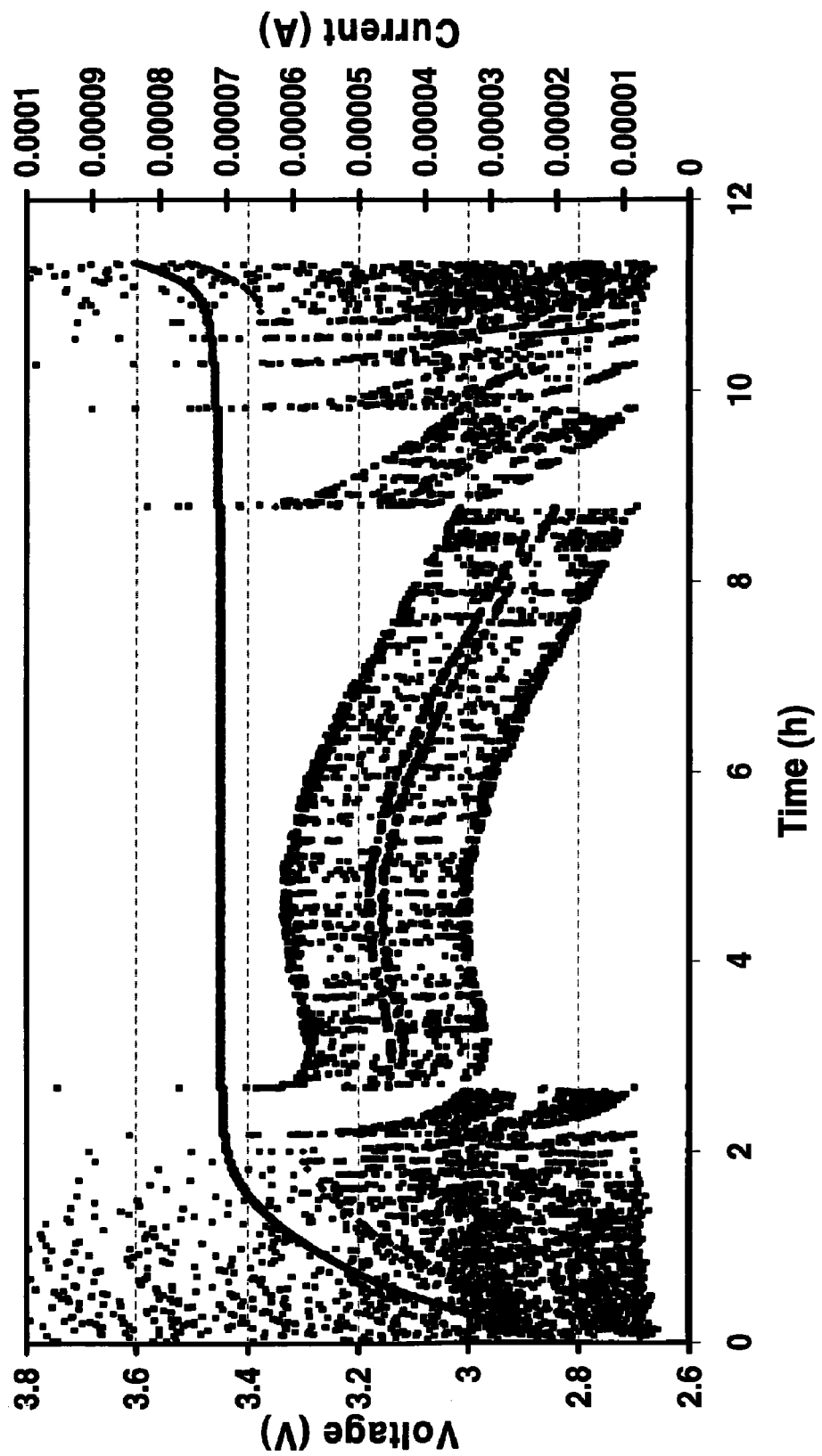
FIG. 12 shows a charging PITT experiment on a nanoscale $Li_{0.95}FePO_4$ material, in which substantial current flow, indicating charging, is seen well before the two-phase plateau voltage is reached.
Figure 13:
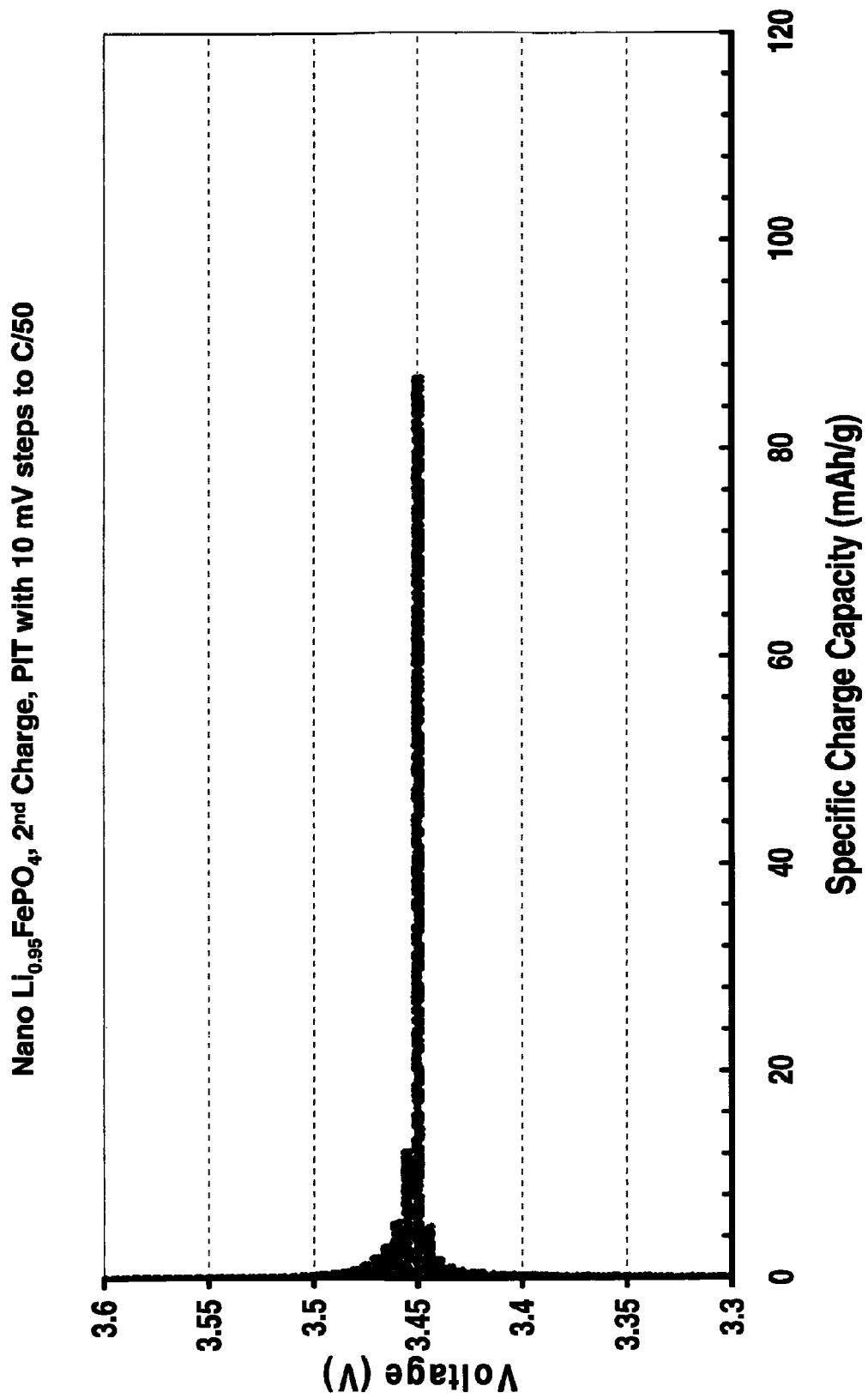
FIG. 13 shows the capacity measured for the cell of FIG. 12 at each voltage step during the PITT charging experiment.
Figure 14:
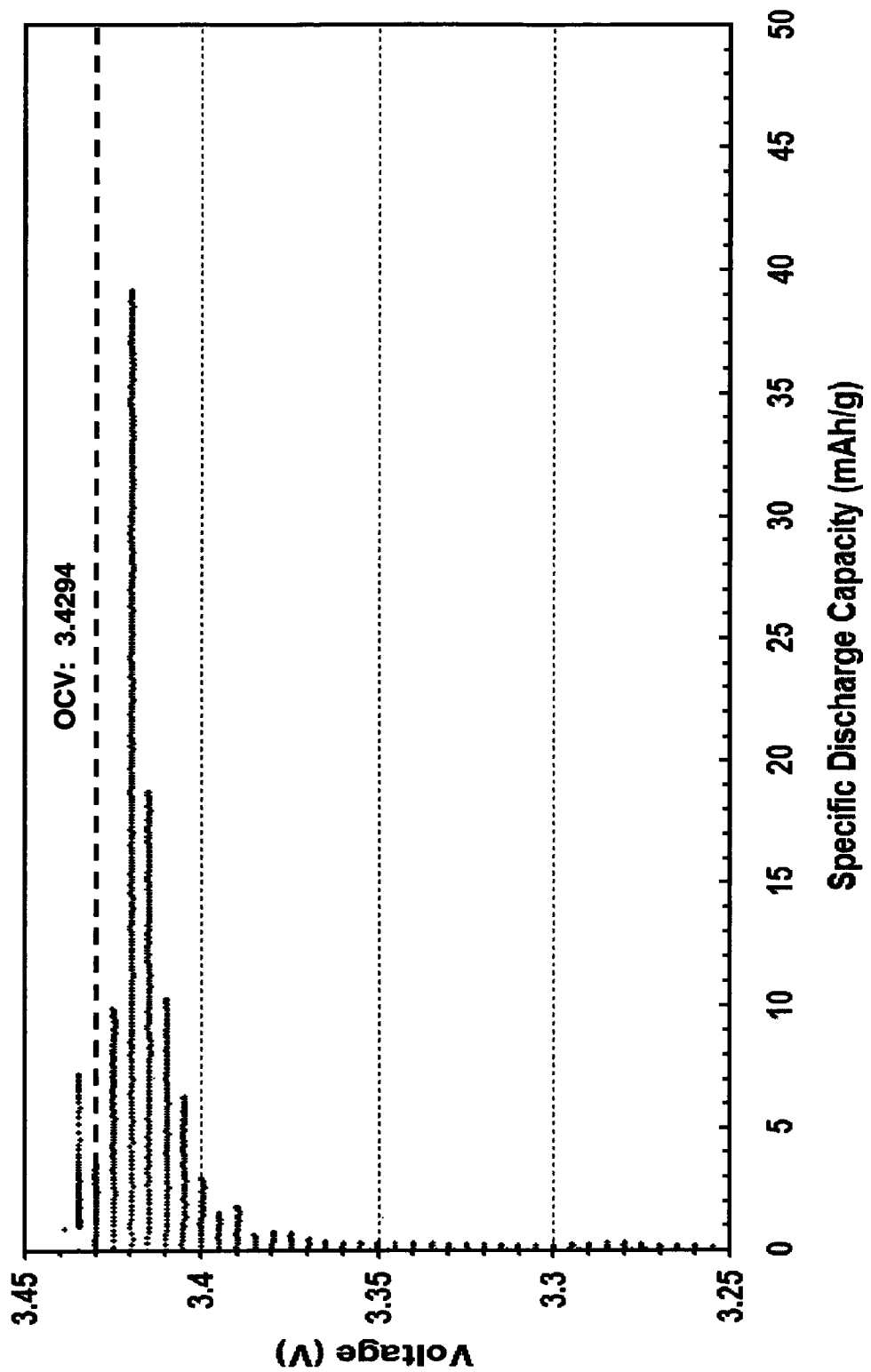
FIG. 14 shows a PITT discharging experiment for the cell of FIG. 12, in which the first voltage step was from a charge voltage of 3.8V to a voltage that is 5 mV above the open-circuit voltage of the cell, measured at a 50% state-of-charge; a substantial capacity of about 8 mAh/g is measured when the PIT voltage is still 5 mV above the OCV.

The nanoscale materials of the invention behave in markedly different manner. FIG. 12 shows a charging PITT experiment on a nanoscale $Li_{0.95}FePO_4$ material, in which substantial current flow, indicating charging, is seen well before the two-phase plateau voltage is reached. In addition, with each upward voltage step, the maximum in current is observed immediately, rather than several hours into the current decay process as seen in FIG. 9. This shows that the phase transformation forming the delithiated $Li_yFePO_4$ phase is more facile in the nanoscale material. FIG. 13 shows the capacity measured for the cell at each voltage step during the PITT charging experiment. It is seen that there is substantial charging occurring below the plateau voltage. Note that because charging can only occur when the applied voltage is equal to or greater than the equilibrium voltage, this result shows that there exist compositions with an equilibrium voltage below that of the two-phase plateau. That is, it demonstrates the existence of a lithium-deficient solid solution $Li_{1-x}FePO4$. In FIG. 14 are shown results for this same cell during a PITT discharging experiment in which the first voltage step was from a charge voltage of 3.8V to a voltage that is 5 mV above the open-circuit voltage of the cell, measured at a 50% state-of-charge. Here, a substantial capacity of about 8 mAh/g is measured when the PITT voltage is still 5 mV above the OCV. Since upon discharge, no driving force exists until the applied voltage is at or below the equilibrium voltage, this result demonstrates the existence of a lithium excess solid solution $Li_yFePO_4$ at voltages above the plateau voltage.

The differences between nanoscale $Li_{1-x}FePO_4/Li_yFePO_4$ and the conventional materials can also be quantified by X-ray diffraction. The presence of a compositionally distinct nonstoichiometry in nanoscale $Li_{1-x}FePO_4$ is demonstrated by unique lattice constants (a, b and c within the orthorhombic unit cell) and unique unit cell volume (given by the product a×b×c). Conventional crystalline olivine $LiFePO_4$ has a larger a and b lattice parameter, and a smaller c lattice parameter, than does crystalline $FePO_4$. A continuous solid solution between $LiFePO_4$ and $FePO_4$ would therefore show a continuous variation between the limiting values of the lattice constants as the lithium concentration varies between one and zero. The lattice constants of the materials according to one or more embodiments of the invention may therefore be used to determine the corresponding nonstoichiometry of the coexisting phases. This was accomplished by carrying out careful X-ray diffraction measurement of the subject materials at different states of lithiation (different states of charge, SOC), from which lattice parameters and other crystallographic information was obtained using Rietveld refinement, a process for analyzing diffraction data that is well-known to those skilled in the art of battery materials synthesis and characterization.

Figure 15:
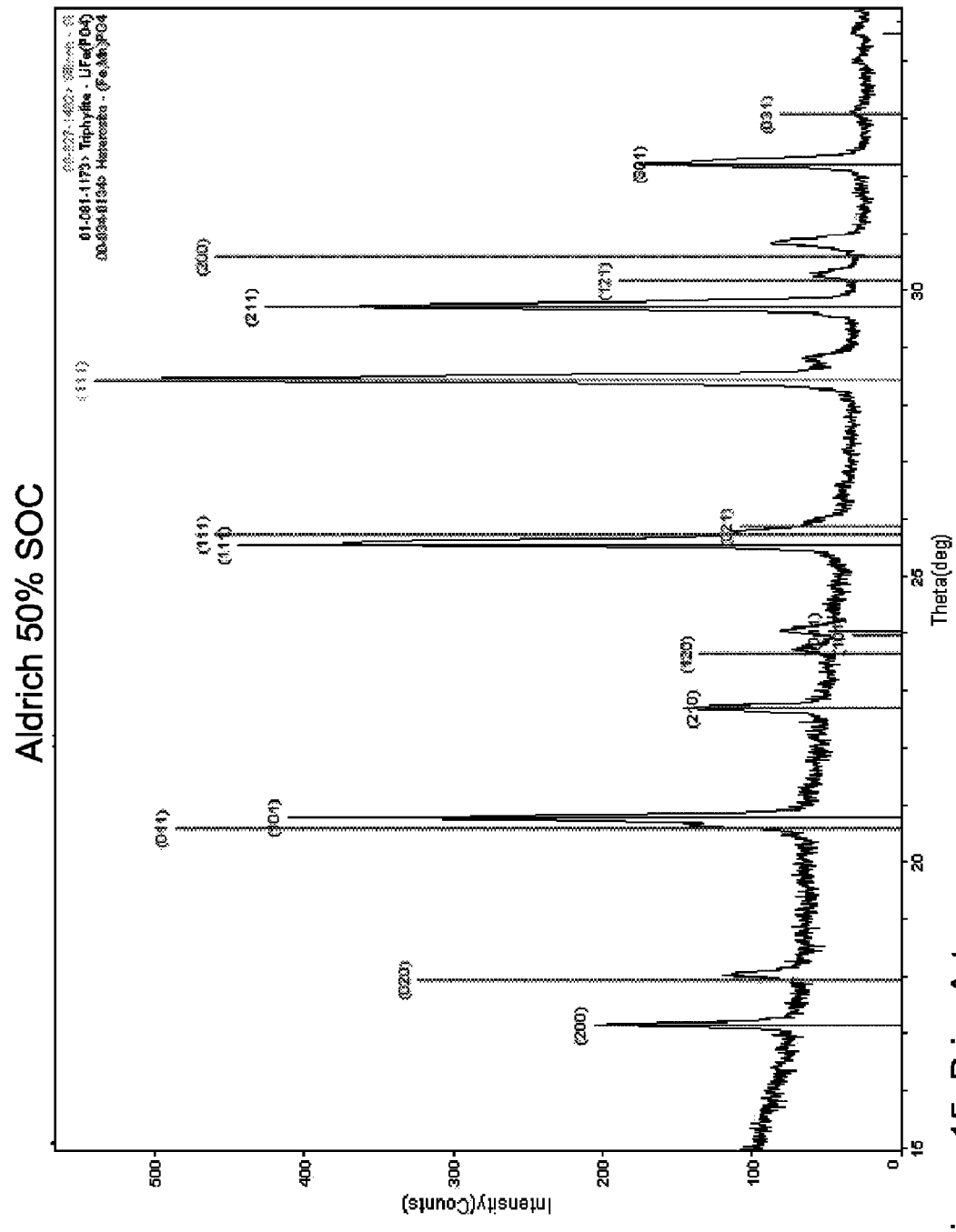
FIG. 15 shows a powder X-ray diffraction pattern obtained from a conventional carbon-coated lithium iron phosphate material at 50% SOC.

FIG. 15 shows a powder X-ray diffraction pattern obtained from a conventional carbon-coated lithium iron phosphate material (Aldrich Chemical) at 50% SOC. To this sample was added silicon powder to provide an internal standard for the X-ray peak positions. It is seen that the peaks for $LiFePO_4$ olivine are well aligned with the expected peak positions for this phase, based on the data in reference 01-081-1173 from the Joint Committee on Powder Diffraction Standards (JD-PDS). The peaks for the olivine form of $FePO_4$ are also seen in FIG. 15, and are somewhat displaced from the positions for a somewhat different composition listed by JCPDS.

Figure 16:
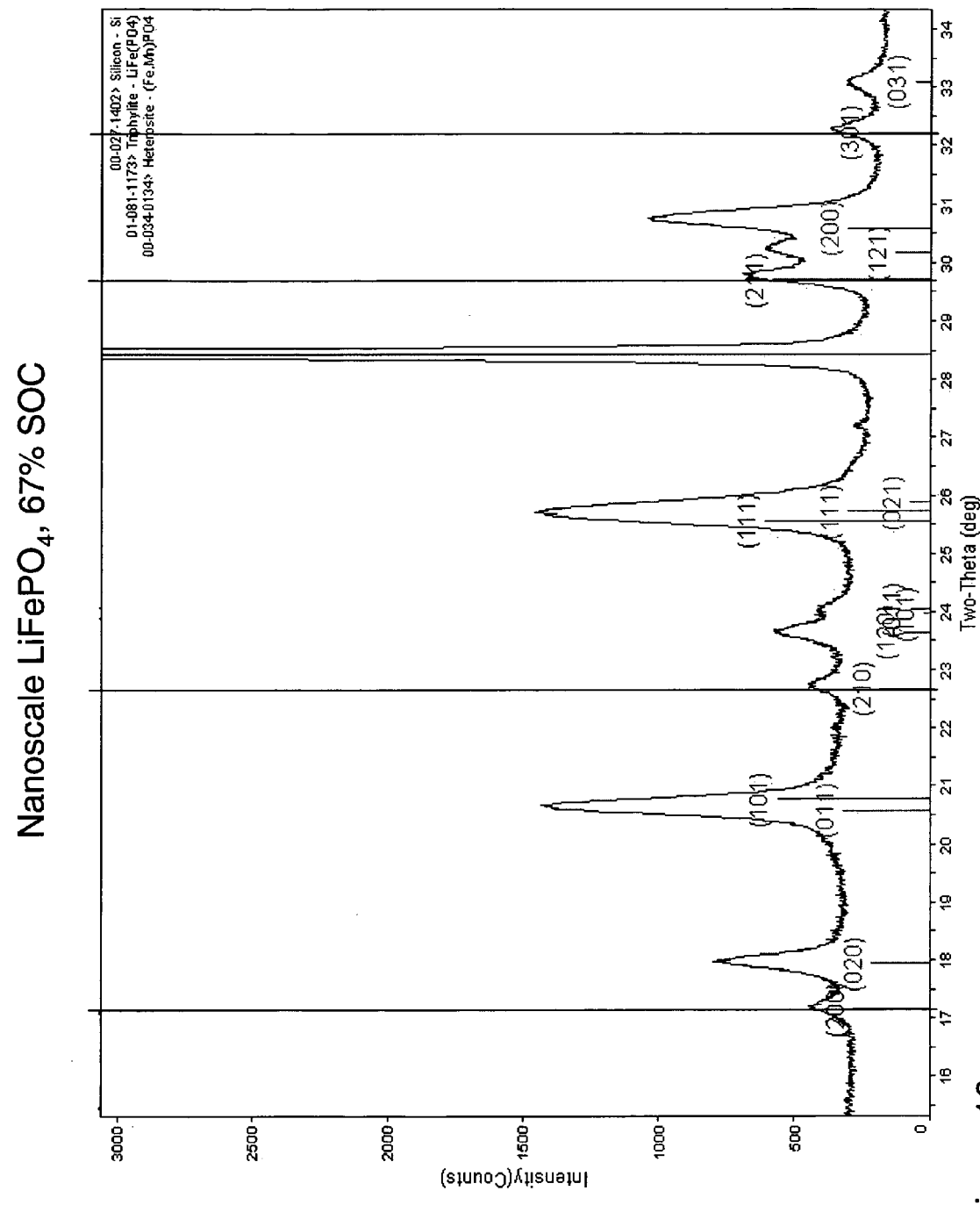
FIG. 16 shows the powder X-ray diffraction pattern obtained from a nanoscale $LiFePO_4$ sample according to the invention, measured at 67% SOC.

FIG. 16 shows the powder X-ray diffraction pattern obtained from a nanoscale $LiFePO_4$ sample according to the invention, measured at 67% SOC. It can be seen that numerous peaks for both the "$LiFePO_4$" and "$FePO_4$" phases are displaced from their corresponding positions in FIG. 15. A precise determination of the lattice constants in these materials was made using the Rietveld refinement method, on powder X-ray diffraction spectra carefully obtained over a wide diffraction angle range (known to those skilled in the art as the "2-theta" range) of 15 degrees to 135 degrees. It was found that the nanoscale materials according to one or more embodiments of the invention, when in a state of charge such that the above mentioned two olivine phases co-exist, have distinctly different lattice parameter values from the conventional material. The lattice parameters and unit cell volumes are reported in Table 1, in which the nanoscale lithium iron phosphate was measured at 67% state-of-charge, compared with similar measurements made for a conventional LiFePO4/FePO4 reported in the literature (A. S. Andersson and J. O. Thomas, J. Power Sources, 97-98: 498 (2001)). For example, on the lithium rich side of the phase diagram, nanoscale $Li_{1-x}FePO_4$ having smaller a and b lattice constants and a larger c lattice constant for than conventional $LiFePO_4$ are obtained. The lithium deficient solid solution coexists with an $Li_yFePO_4$ phase having the lattice parameters for a, b that are larger and c that is smaller than in conventional $FePO_4$. These measurements show that indeed x and y are larger than their corresponding values in conventional $LiFePO_4/FePO_4$, notwithstanding some smaller nonstoichiometry existing in those materials as well. From the Rietveld refinement of the nanoscale sample, a crystallite size of about 28 nm was determined, which is close to the calculated equivalent spherical particle size of 36.1 mm and shows that the high surface area of the sample is due to nanoscale crystallites of the lithium iron phosphate and not due to a high surface area impurity or additive phase.

TABLE 1

Lattice constants and unit cell volume for $LiFePO_4$, $FePO_4$, $Li_{1-x}PO_4$ and $Li_yFePO_4$

| Material | a (Å) | b (Å) | c (Å) | Unit cell volume (Å$^3$) |
|---|---|---|---|---|
| $LiFePO_4$ | 10.329 | 6.007 | 4.691 | 291.02 |
| Li-deficient $Li_{1-x}FePO_4$ | 10.288 | 5.991 | 4.698 | 289.56 |

TABLE 1-continued

Lattice constants and unit cell volume for
$LiFePO_4$, $FePO_4$, $Li_{1-x}PO_4$ and $Li_yFePO_4$

| Material | a (Å) | b (Å) | c (Å) | Unit cell volume (Å³) |
|---|---|---|---|---|
| $FePO_4$ | 9.814 | 5.789 | 4.782 | 271.7 |
| Li-rich $Li_yFePO_4$ | 9.849 | 5.809 | 4.781 | 273.55 |

FIG. 15 shows a powder X-ray diffraction pattern obtained from a conventional carbon-coated lithium iron phosphate material (Aldrich Chemical) at 50% SOC. To this sample was added silicon powder to provide an internal standard for the X-ray peak positions. It is seen that the peaks for $LiFePO_4$ olivine are well aligned with the expected peak positions for this phase, based on the data in reference 01-081-1173 from the Joint Committee on Powder Diffraction Standards (JCPDS). The peaks for the olivine form of $FePO_4$ are also seen in FIG. 15, and are somewhat displaced from the positions for a somewhat different composition listed by JCPDS.

The a, b lattice constants for the lithium deficient $Li_{1-x}FePO_4$ is less than that for $LiFePO_4$ and the a, b lattice constants for the lithium rich $Li_yFePO_4$ is greater than that for $FePO_4$. Therefore, the mismatch in lattice parameters and unit cell volume is decreased in the nanoscale materials of the invention, which may have a profound influence on the electrochemical performance of the material, particularly at high charge/discharge rates. This is because the facility with which one phase is formed from the other upon charging and discharging of the electrochemical cell is dependent on the mismatch in lattice parameters (if crystalline) and the relative volumes of the two co-existing phases.

The lattice parameters and unit cell volume between the coexisting phases $Li_{1-x}FePO_4$ and $Li_yFePO_4$ and the unit cell volume are reported in Table 1. From these values, one may readily compute the differences in lattice parameters and in unit cell volumes, on a percentage basis, for a transformation from the $Li_{1-x}FePO_4$ to $Li_yFePO_4$ phase, which corresponds to charging of a cell using the lithium iron phosphate as the positive electrode, or from $Li_yFePO_4$ to $Li_{1-x}FePO_4$, which corresponds to discharging. The percentage changes upon charging are found to be slightly smaller than those upon discharging, and this may cause differences in the inherent rate of charging versus discharging within any one material. However, to facilitate comparison of the nanoscale and conventional materials, we may also compute the differences in the respective values of any lattice constant or unit cell volume as a percentage of the mean value between the two, as has been done in Table 2. That is, the percentage difference in the a lattice constant is the difference in a between any two materials divided by the arithmetic mean value of a for those two samples. Herein, unless otherwise stated, the percentage differences are computed in this manner. For nanoscale $Li_y$-$FePO_4$/$Li_{1-x}FePO_4$ the differences in lattice parameters are $\Delta a=4.36\%$, $\Delta b=3.07\%$, $\Delta c=-1.75\%$, and the difference in unit cell volume is $\Delta V=5.69\%$. In comparison, for conventional $LiFePO_4/FePO_4$, the corresponding numbers are $\Delta a=5.11\%$, $\Delta b=3.68\%$, $\Delta c=-1.93\%$, and $\Delta V=6.87\%$ for the limiting endmembers. We also measured a conventional material (Aldrich Chemical) that was taken to 50% state-of-charge, and in which the co-existing compositions have the small permitted extent of nonstoichiometry. Here the difference is $\Delta a=4.91\%$, $\Delta b=3.64\%$, $\Delta c=-2.03\%$, and $\Delta V=6.52\%$. These unit cell and lattice parameter differences are summarized in Table 2.

Although not shown in Table 2, one may also readily compute the misfit strain of a plane separating the two limiting compositions $Li_yFePO_4$ and $Li_{1-x}FePO_4$. This is important because the formation of one phase from the other during electrochemical cycling must necessarily introduce an interface between the two materials, which is a two-dimensional feature. Inspection of the results in Table 1 shows that the plane formed by the principal axes a and b (the ab plane or in Miller indices the {110} plane) have the largest difference in area between the $Li_yFePO_4$ and $Li_{1-x}FePO_4$. the ac plane (or {101}) has the next largest difference, and the bc plane (or {011} has the least difference. This indicates that the bc plane is the most preferred orientation along which one phase will grow topotaxially upon the other (or vice versa). Comparing the nanoscale and conventional materials in Table 1, these differences are 7.43%, 2.62% and 1.32% respectively for the nanoscale material, and 8.79%, 3.19%, and 1.76% respectively for the conventional material. In the Aldrich material measured at 50% SOC these differences are 8.55%, 2.88% and 1.62% respectively. Thus, according to one embodiment, the nanoscale materials of the invention are defined by having a plane formed by any of the principal axes of the crystal along which the strain measured as a change in the area is less than about 1.6%, or less than about 1.5%, or less than about 1.4%. According to another embodiment, none of the planes formed by any of the principal axes of the crystal have such a strain exceeding 8%, or 7.5%, or 6%.

TABLE 2

Lattice parameter and unit cell data

| Material | $\Delta$ a (%) | $\Delta$ b (%) | $\Delta$ c (%) | $\Delta$ V (%) |
|---|---|---|---|---|
| $LiFePO_4$ $FePO_4$ | 5.11 | 3.68 | −1.93 | 6.87 |
| Li-deficient nano $Li_{1-x}FePO_4$ Li-rich nano $Li_yFePO_4$ | 4.36 | 3.07 | −1.75 | 5.69 |
| $Li_{1-x}FePO_4$ (conventional) $Li_yFePO_4$ (conventional) | 4.91 | 3.64 | −2.03 | 6.52 |

These differences between the nanoscale and conventional materials are significant, due to the fact that the elastic moduli of these inorganic compounds are very high, e.g., on the order of 100 GPa. Small percentage differences in lattice parameters and unit cell volumes result in large elastic energies if these highly stiff solids are made to accommodate the strains without breaking apart. By engineering the nanoscale material of the invention to have small differences in lattice parameters and unit cell volumes between coexisting phases, not only is the energy required to transform one phase from the other decreased, the likelihood of mechanical fracture and defect formation during cycling, so-called "electrochemical grinding," is minimized, leading to an exceptionally long cycle life for the materials of the invention.

It is also recognized that while there is a limiting particle size above which the benefits seen in the materials of the invention are no longer realizable, it is expected that there is virtually no practical lower limit to the particle sizes that may be obtained through synthesis methods known to those skilled in the art. As the particle size of the nanoscale materials of the invention decrease, the extent of nonstoichiometry x and y under any given synthesis or test conditions increases, and the differences in lattice constants and unit cell volumes between the coexisting phases decreases as well. That is, referring to FIG. 4, the boundaries of the two-phase regime move inward in composition and down in temperature. For sufficiently fine particle sizes, a complete solid solution becomes achievable at room temperature.

The cycle life of a rechargeable battery is typically defined as the number of charge/discharge cycles, over a specified voltage range and at a specified current rate, over which the capacity of the battery decreases to a certain percentage of the initial value. Conventional cathode-active materials and rechargeable batteries using these materials, including $LiFePO_4$ olivine and its compositional derivatives, over a voltage range of about 2V to 3.8V and at a current rate of about 1C, typically show a cycle life of less than 1000 cycles before the capacity decreases to 80% of its initial value. In contrast, the materials and devices of the invention can undergo in excess of 1000, even in excess of 2000, and in some instances in excess of 5000 cycles before decreasing in capacity by this amount. At higher charge discharge rates, for example a 5C charge/discharge rate over the same voltage range, conventional materials will typically show a cycle life of less than about 500 cycles before decreasing in capacity to 80% of the initial value. In contrast, the materials and devices according to one or more embodiments of the invention may exhibit greater than 1000 full charge/discharge cycles before decreasing in capacity by this amount.

Many applications of a high power battery, including but not limited to hybrid electric vehicle applications, require high rate charge/discharge pulses over a narrower range of voltage or capacity than full cycling. Under such conditions, the cycle life of the materials and devices of the invention can be extraordinarily long. One well-known pulse testing protocol is the "HPPC" test defined by the United States Advanced Battery Consortium (USABC). The materials of the invention, when used in a battery meeting the specific energy and specific power requirements defined by the USABC, are able to exhibit in excess of 150,000 of cycle life before the performance of the battery falls below the defined useful limits.

It is understood that during the dynamic process of lithium intercalation and deintercalation, the stresses generated by the differences in lattice parameters can cause the unit cell parameters and corresponding compositions x and y of the coexisting phases to temporarily deviate from their stable values. Nonetheless, upon allowing some time for stress relaxation and local equilibration within the materials, the above described differences between nanoscale and conventional materials are seen, thereby clearly distinguishing the two classes of materials from each other. The properties of the materials including the lithium nonstoichiometry may not yet be at their stable state when first preparing a material and assembling an electrochemical device. In use as a reversible electrochemical device such as a rechargeable battery, the behavior of the material during the very first cycle may not be as important as the behavior during subsequent cycling. Therefore the differences in unit cell parameters and lithium concentrations desirably are measured after at least one full intercalation and deintercalation cycle between the working voltage limits of the device, and after allowing said material to rest in its state-of-charge for at least 12 hours. According to one or more embodiments of the present invention the extent of solid solution in each endmember phase may increase with electrochemical cycling, allowing the transformation from one phase to the other to become more facile with the use of the battery. This is manifested in, amongst other behavior, as a decrease in the impedance of the battery with charge/discharge cycling.

In the materials according to one or more embodiments of the invention, the formation of one phase from the other (and vice versa) upon electrochemical cycling is made much more facile in comparison to previous materials by the fact that the materials are nanoscale, and because they have been engineered to have smaller lattice parameter and unit cell mismatch between the two co-existing phases. The advantages of minimizing the mismatch stresses in order to permit facile phase transitions and high rates of charge and discharge has not previously been recognized in the field of battery materials.

Conventional understanding also teaches away from the use of high surface area active materials in battery electrodes, especially on the positive electrode side, for several reasons, such as poor safety, excessive self-discharge, rapid impedance buildup over time, or shortened cycle life at elevated temperatures, or low tap density and packing density resulting in undesirably low energy density in fabricated batteries. For example, it is well-known that the cathode active materials $LiCoO_2$ and $LiNiO_2$, including their solid solutions and derivatives, can create unsafe conditions in the highly charged state due to the presence of their transition metals in the highly oxidized 4+ valence state. Overcharged and/or overheated lithium ion cells using these cathode materials, even in conventional form, can exhibit thermal-runaway leading to fire or explosion, and it is generally considered to be the case that such risks are exacerbated by the use of higher surface area active materials. Also, at elevated temperatures and over long operating times, lithium ion cells using these cathode materials exhibit impedance rise due to interfacial reactions, which lowers the power capability. Thus, the use of these materials in a nanocrystalline state generally is considered unwise for both safety and life reasons. As another example, the cathode active material $LiMn_2O_4$ has been used in high power lithium ion batteries, but frequently exhibits permanent capacity loss after use or storage, related to the dissolution of manganese in the electrolyte and/or protonation of the surface of the active material particles by residual acid in the liquid electrolytes used in such cells. Since these effects are exacerbated in high surface area materials, common knowledge teaches away from the use of nanocrystalline $LiMn_2O_4$. These observations suggest that nanoscale particle sizes could be undesirable with respect to certain properties. However, using the nanoscale ion storage materials described herein, such difficulties can be overcome while retaining energy density and power density advantages.

In the materials according to one or more embodiments of the invention, the formation of one phase from the other (and vice versa) upon electrochemical cycling is made much more facile in comparison to previous materials by the fact that the materials are nanoscale, and because they have been engineered to have smaller lattice parameter and unit cell mismatch between the two co-existing phases. The advantages of minimizing the mismatch stresses in order to permit facile phase transitions and high rates of charge and discharge have not previously been recognized in the field of battery materials.

While not being bound by any mode or theory of operation, the following mechanisms may provide a basis for unique properties of the nanocrystalline materials according to one or more embodiments of the present invention. In iono-covalent compounds having a lattice discontinuity, such as a free surface or grain boundary, due to differences in the free energies of formation of lattice defects, the surface can become enriched in one or more atomic species relative to others. This gives rise to an excess surface charge, and a compensating space-charge layer that penetrates a short distance into the solid, the space-charge layer being composed of charged defects. When the space-charge defects are vacancies, the bulk of the crystal then has an overall excess of the vacancies, namely an altered stoichiometry compared to the ideal crystal in the absence of the surface or interface. The space-charge phenomenon is well-established in ionic crystals through many theoretical and experimental studies, including papers published by one of the inventors. (See, e.g., Y.-M. Chiang, D. P. Birnie, III, and W. D. Kingery, *Physical Ceramics: Principles for Ceramic Science and Engineering*, Chapter 3, John Wiley & Sons (1997); Chiang et al., "Characterization of Grain Boundary Segregation in MgO," *J. Am. Ceram. Soc.*, 64:383-89 (1981); Ikeda et al., "Space Charge Segregation at Grain Boundaries in Titanium Dioxide: Part I, Relationship Between Lattice Defect Chemistry and Space Charge Potential," *J. Am. Ceram. Soc.*, 76:2437-2446 (1993); Ikeda et al., "Space Charge Segregation at Grain Boundaries in Titanium Dioxide: Part II, Model Experiments," *J. Am. Ceram. Soc.*, 76:2447-2459 (1993).) We have experimentally observed nonstoichiometry and extended solid solution behavior consistent with space-charge influenced behavior of nanocrystals in these materials. Accordingly, while not being bound by any particular theory, we address the possible origins of this behavior.

Consider a starting point of a stoichiometric $LiFePO_4$ olivine compound that is then allowed to equilibrate its free surface with its surroundings. The surface is likely to become enriched in the ion having the lowest defect formation energy and/or sufficient mobility to be removed preferentially to the surface. In $LiFePO_4$, this ion is energetically and kinetically most likely to be lithium. Creation of a lithium-rich surface must leave a lithium-deficient interior, in which the deficiency corresponds to the presence of lithium vacancies. As with other compounds exhibiting space-charge behavior, the lithium deficiency is not likely to be distributed uniformly across the interior. Instead, the lithium vacancies may be preferentially concentrated near the surface in a space-charge layer. The spatial extent of this layer depends at thermal equilibrium on the defect concentration, the dielectric constant of the material, and the temperature. If the system is not at equilibrium, the extent of the space-charge layer depends on transport kinetics of the ions and defects as well.

Figure 17:
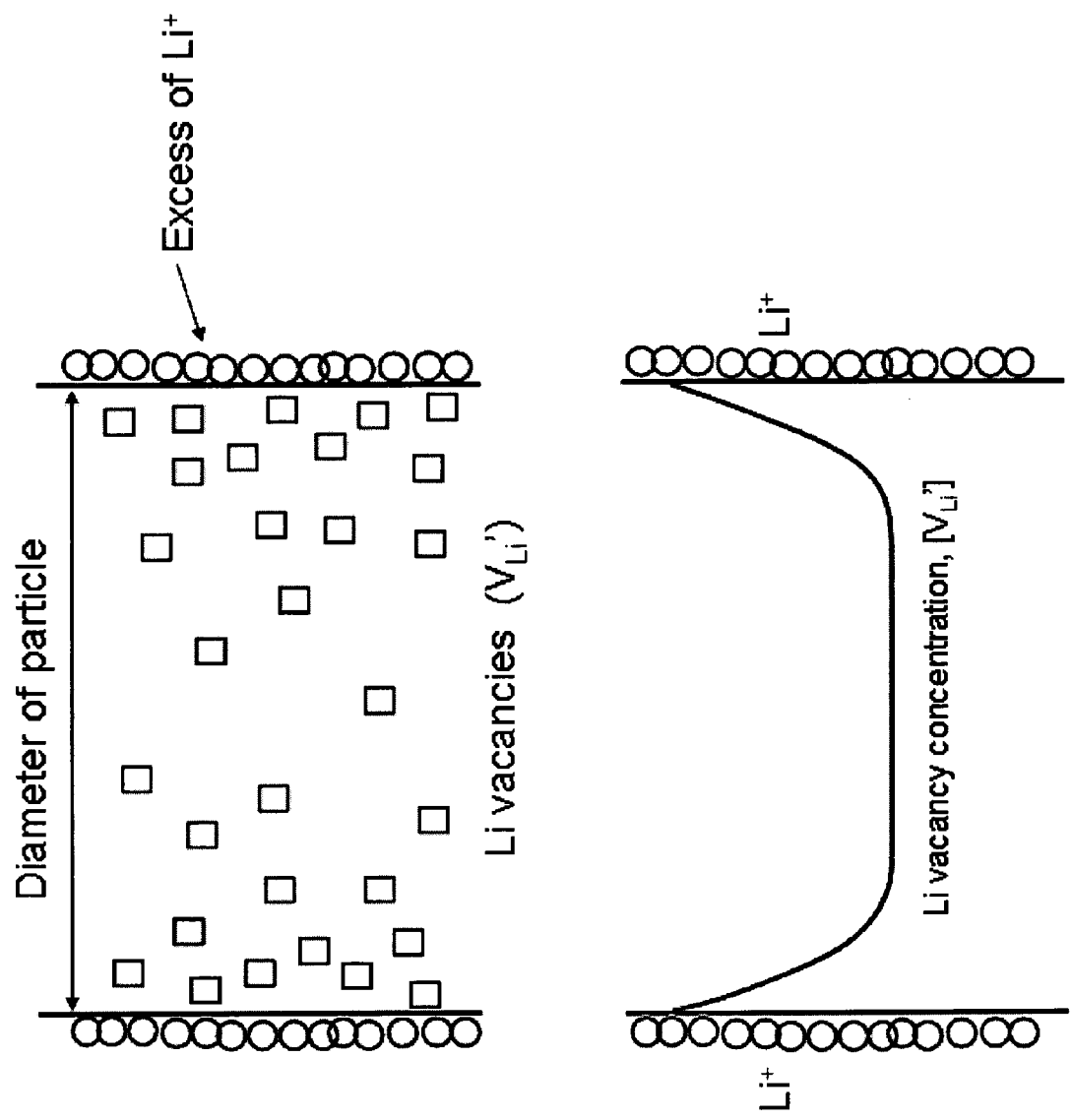
FIG. 17 is a schematic illustration of the spatial distribution of space-charge defects in a nanoscale lithium storage material according to certain embodiments.

The spatial distribution of defects is shown schematically in FIG. 17. The spatial extent of the space-charge layer can be of the order of one to several nanometers. The near-surface concentration of vacancies or other defects can be many times greater than the concentration that would be tolerated in a bulk crystal as a solid solution, i.e., without having precipitation or phase-separation. Thus, for a sufficiently small nanoparticle, nanorod, nanofiber or thin film, the interior of the particle has a measurably higher lithium deficiency than a conventional particle. Overall, the particle now behaves in a nonstoichiometric manner, especially if the Faradaic behavior of the $Li^+$ at the surface differs from that in the bulk. X-ray diffraction measurements and electrochemical tests can detect these differences compared to conventional materials. Furthermore the surface lithium ions can be reacted easily by surface reactions with adjacent media such as liquid electrolyte, or evaporated upon heating or reaction with the gas phase as a lithium oxide or lithium carbonate species. In such instances, the nanoparticle is left more lithium-deficient than a conventional particle or crystal, yet said defects giving rise to the nonstoichiometry remain as a solid solution rather than causing the nanoparticles to form new and separate phases as in a conventional material. In the case of a near-surface enrichment of lithium vacancies, the $Fe^{3+}/Fe^{2+}$ ratio also can vary spatially with distance from the surface, and provide not only greater electronic conductivity to the particle as a whole, but a greater electronic conductivity at the surface of the particle than in the interior.

In at least some embodiments, the nanoscale ion storage materials described herein typically contain less than about 5 weight percent, or about 3 weight percent, of any additional phase that does not substantially store ions, but may provide added electrical conductivity. Such additional phases include, for example, carbon, a metal, or an intermetallic phase, such as a metal phosphide, metal carbide, metal nitride, or mixed intermetallic compound, such as metal carbide-nitride or metal carbide-phosphide. In certain embodiments, for use as a storage electrode, the nanoscale material typically is formulated into an electrode by standard methods, including the addition of a few weight percent of a polymeric binder, and less than about 10 weight percent of a conductive additive, such as carbon. In at least some such embodiments, the electrodes typically are coated onto one or both sides of a metal foil, and optionally pressed to a coating thickness of between about 30 micrometers and about 200 micrometers, providing a charge storage capacity of between about 0.25 $mAh/cm^2$ and about 2 $mAh/cm^2$. Such electrodes can be used as the positive or negative electrode in a storage battery. Their performance can be evaluated, for example, using laboratory cells of the coin-cell or so-called Swagelok cell types, in which a single layer of electrode is tested against a counter-electrode (typically lithium metal when the nanoscale material is a lithium storage material) using galvanostatic (constant current) or potentiostatic (constant voltage) tests or some combination of the two. Under galvanostatic conditions, the current rate can be described as "C-rate," in which the rate is C/n, and n is the number of hours required for substantially complete charge or discharge of the cell between a selected upper and lower voltage limit.

In certain embodiments, when used as the positive electrode in a lithium battery, the electrodes are typically assembled into multilayer laminated cells of wound or stacked configuration, using lithium metal or an anode-active lithium storage electrode as the negative electrode. Non-limiting examples of suitable negative electrode materials include lithium metal, carbon, an intermetallic compound, or a metal, metalloid or metal alloy that includes such lithium-active elements as Al, Ag, B, Bi, Cd, Ga, Ge, In, Pb, Sb, Si, Sn or Zn. The negative electrode material can be selected or designed for high rate capability. The storage batteries thus assembled can employ a porous electronically insulating separator between the positive and negative electrode materials, and a liquid, gel or solid polymer electrolyte. The storage batteries can have electrode formulations and physical designs and constructions that are developed through methods well-known to those skilled in the art to provide low cell impedance, so that the high rate capability of the nanoscale ion storage material can be utilized.

The nanoscale ion storage materials described herein, when tested in such laboratory cells or in storage batteries, will exhibit greatly improved capacity retention at high charge and discharge rates compared to their coarse-grained counterparts. Typically, over a voltage range in which the upper voltage limit is about 120% of, and the lower voltage limit is about 50% of, the average voltage exhibited by the cell at a low rate of C/5 or less, the discharge capacity measured at a 5C rate compared to the capacity measured at a low rate of C/5 or less (i.e., the capacity retention) will be about 80% or greater, in some cases about 90% or greater, or about 95% or greater. At a 10C rate, the capacity retention can be about 75% or greater, in some cases about 85% or greater, for example, about 90% or greater, or about 93% or greater. At a 20C rate, the capacity retention can be about 60% or greater, in some cases about 70% or greater, for example, about 80% or greater, or about 85% or greater. At a 35C rate, the capacity retention can be about 50% or greater, in some cases about 60% or greater, for example, about 75% or greater, or about 80% or greater. At a 50C rate, the capacity retention can be about 30% or greater, in some cases about 40% or greater, for example, about 50% or greater, or about 60% or greater.

In some embodiments, when used in a complete wound or stacked multilayer cell having at least 5 Wh energy at a C/5 or lower discharge rate, the nanoscale materials described herein can provide cells with the following levels of specific power (power density) and specific energy (energy density) for substantially complete discharge starting from a fully charged state (i.e., 100% depth of discharge). The cells can exhibit, for example, specific power of at least about 500 W/kg (1000 W/L) at specific energy of at least about 100 Wh/kg (205 Wh/L), specific power of at least about 950 W/kg (2000 W/L) at specific energy of at least about 95 Wh/kg (190 Wh/L), specific power of at least about 1300 W/kg (2500 W/L) at specific energy of at least about 90 Wh/kg (180 Wh/L), and specific power of at least about 1600 W/kg (3200 W/L) at specific energy of at least about 85 Wh/kg (175 Wh/L). It is understood that for shallower depth of discharge, the specific power and power density can be significantly higher than those given above.

The following non-limiting examples further illustrate certain embodiments.

EXAMPLE 1

Lithium iron phosphate of overall composition $LiFePO_4$ was prepared using the following proportions of starting materials:

| | |
|---|---|
| $Li_2CO_3$ (Alfa-Aesar, 99.999%) | 0.739 g |
| Iron (II) oxalate (Alfa-Aesar, 99.999%) | 3.598 g |
| Ammonium phosphate (Aldrich, 99.998%) | 2.301 g |

While these basic components are known as starting materials for the synthesis of conventional $LiFePO_4$, here through the use of a high purity acetone as the solvent (reagent grade, J. T. Baker), and using extended mixing to allow the starting components to undergo a gas-evolving mechanochemical reaction, a precursor is obtained that upon firing yields a low carbon, very high specific surface area nanoscale phosphate. The dry components were weighed and mixed with a sufficient quantity of high purity acetone to create a free-flowing suspension, and the mixture was roller-milled in a sealed polypropylene jar using zirconia milling media for 24 hours, obtaining a homogeneous and finely-divided precursor suspension. The precursor was thoroughly dried and then heat treated in a tube furnace under flowing argon gas (grade 5.0), first at 350° C. for 10 h and then at 600° C. for 20 h. After heat treatment, the specific surface area was measured using the BET method and found to be 38.6 $m^2$/g, for which the equivalent spherical particle diameter was calculated to be 43.2 nm, assuming a crystal density of 3.6 g/$cm^3$. The carbon content was analyzed by the combustion method and found to be below 3 weight percent, such that the measured surface area can be predominantly attributed to the nanoscale phosphate phase. For powders prepared by this procedure, transmission electron microscopy imaging such as in FIGS. 1 and 2 showed that the observed average particle diameter was close to the equivalent spherical particle size calculated from the BET specific surface area.

Figure 18:
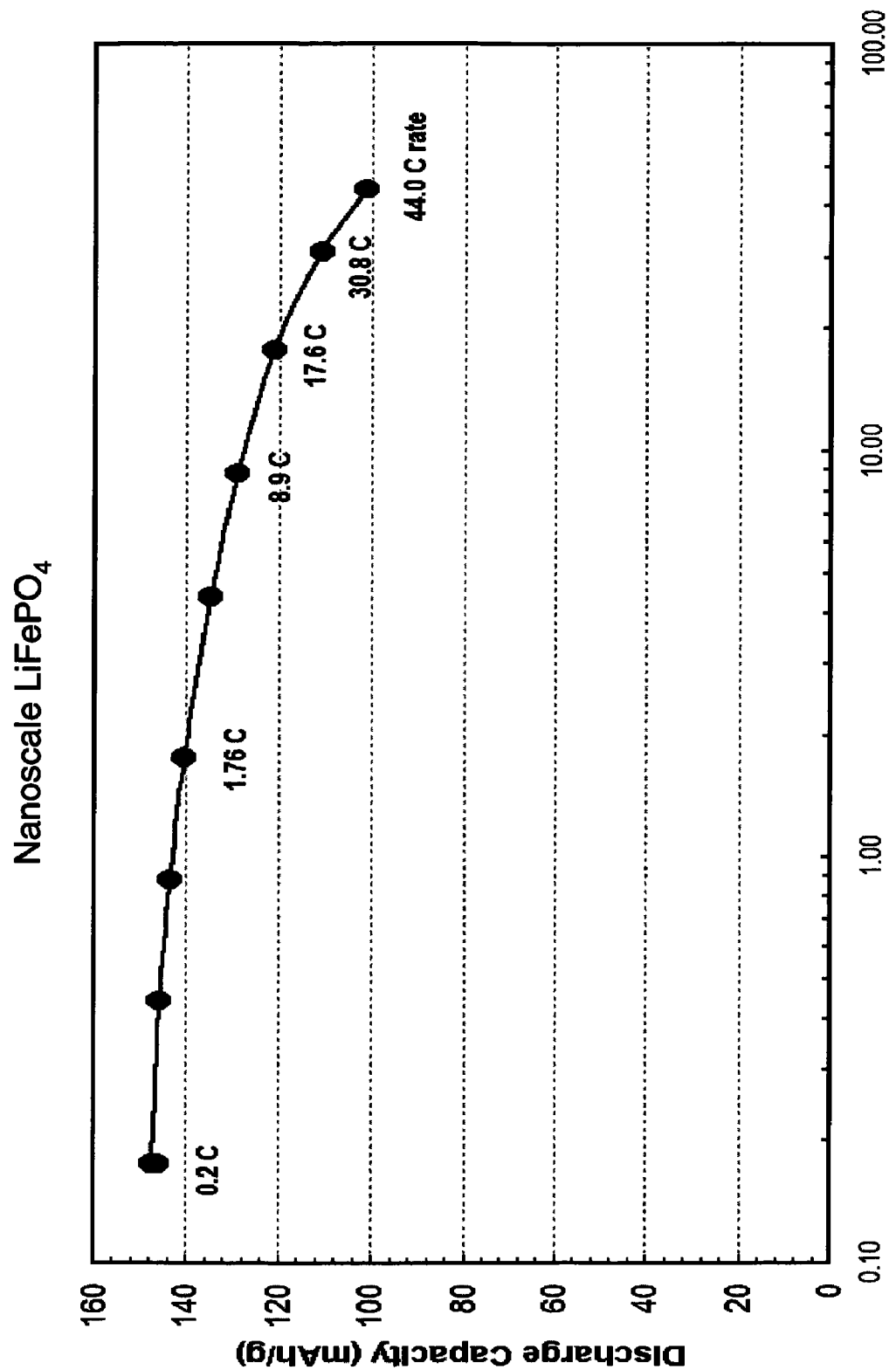
FIG. 18 shows the specific capacity of the nanoscale lithium iron phosphate of Example 1 as measured from a Swagelok cell.

The fired powder was formulated into an electrode having the following composition:

| | |
|---|---|
| Nanoscale lithium iron phosphate powder | 3.95 g |
| Super P carbon | 0.50 g |
| Kynar 2801 binder | 0.55 g |
| γ-butyrolactone (solvent) | 28.5 g | and mixed to create a free flowing suspension, then cast in a uniform layer onto aluminum foil. The coating was dried in vacuum at 100-110° C., after which it was measured to have a thickness of about 100 micrometers, and punched into discs of 1-2 cm diameter as appropriate to fit Swagelok or coin cells. The electrode coatings were assembled into lithium half-cells using Swagelok or coin cell hardware, using a microporous polymer separator, lithium foil as the negative electrode (total lithium content at least ten times greater than the theoretical storage capacity of the positive electrode), and a conventional nonaqueous lithium ion battery electrolyte containing $LiPF_6$ as the lithium salt. FIG. 18 shows the specific capacity of the nanoscale lithium iron phosphate as measured from a Swagelok cell. The ability of the nanoscale material to deliver high capacities at high charge or discharge rates is remarkable. The discharge capacity retention here is used to describe the percentage of the capacity measured at a particular C-rate, over the voltage range 2.0-3.8V, compared to the capacity observed at C/5 rate over the same voltage range, as shown in FIG. 16. At 1.8C rate, the capacity retention was 95.9%; at 4.4C rate, the retention was 92.1%; at 9C rate, the retention was 88.1%; at 18C rate, it was 82.6%; at 31C rate, it was 75.6%; and at 44C rate, it was 69.1%. Those skilled in the art of battery materials will recognize that these are extraordinarily high capacity retention values compared to conventional ion storage materials. The capacity measured during the first charging cycle for this sample was about 6.6% less than the capacity during the first discharge cycle, showing that the nonstoichiometry x of the as-produced material is about 6.6%.

EXAMPLE 2

A nanoscale ion storage material having overall composition $Li_{0.99}FePO_4$ was synthesized and tested following procedures as described in Example 1, except that a larger batch size was made and different sources of starting materials were used. The composition was made using the following proportions of starting materials:

| | |
|---|---|
| $Li_2CO_3$ (SQM) | 7.4337 g |
| Iron (II) oxalate (Elementis) | 36.2696 g |
| Ammonium phosphate (Heico) | 22.5541 g |

A larger sealed polypropylene container, and steel milling media were used to mill the starting materials for 72 hours. Firing of the dried powder was conducted in nitrogen of 99.999% purity, and the final firing condition was 700° C. for 5 h. This powder was measured by the BET method to have a specific surface area of 45.4 $m^2$/g, corresponding to an equivalent spherical particle diameter of 36.7 nm. Combustion analysis showed that it had a residual carbon concentration of about 3 wt %. FIG. 5 shows test results from electrodes and lithium half-cells constructed using Swagelok hardware as in Example 1. It is seen that the first-charge capacity was lower than the first-discharge capacity by 11.5%, both being measured at about a C/5 rate, showing that the initial nonstoichiometry of the sample may be about 11.5%. At higher C-rates, outstanding capacity retention was observed. At a 5C rate, the capacity retention was about 95%, at a 10C rate, the capacity retention was about 90%, and at a 20C rate, the capacity retention was in the range 66-72% for three cells tested.

EXAMPLE 3

Figure 19:
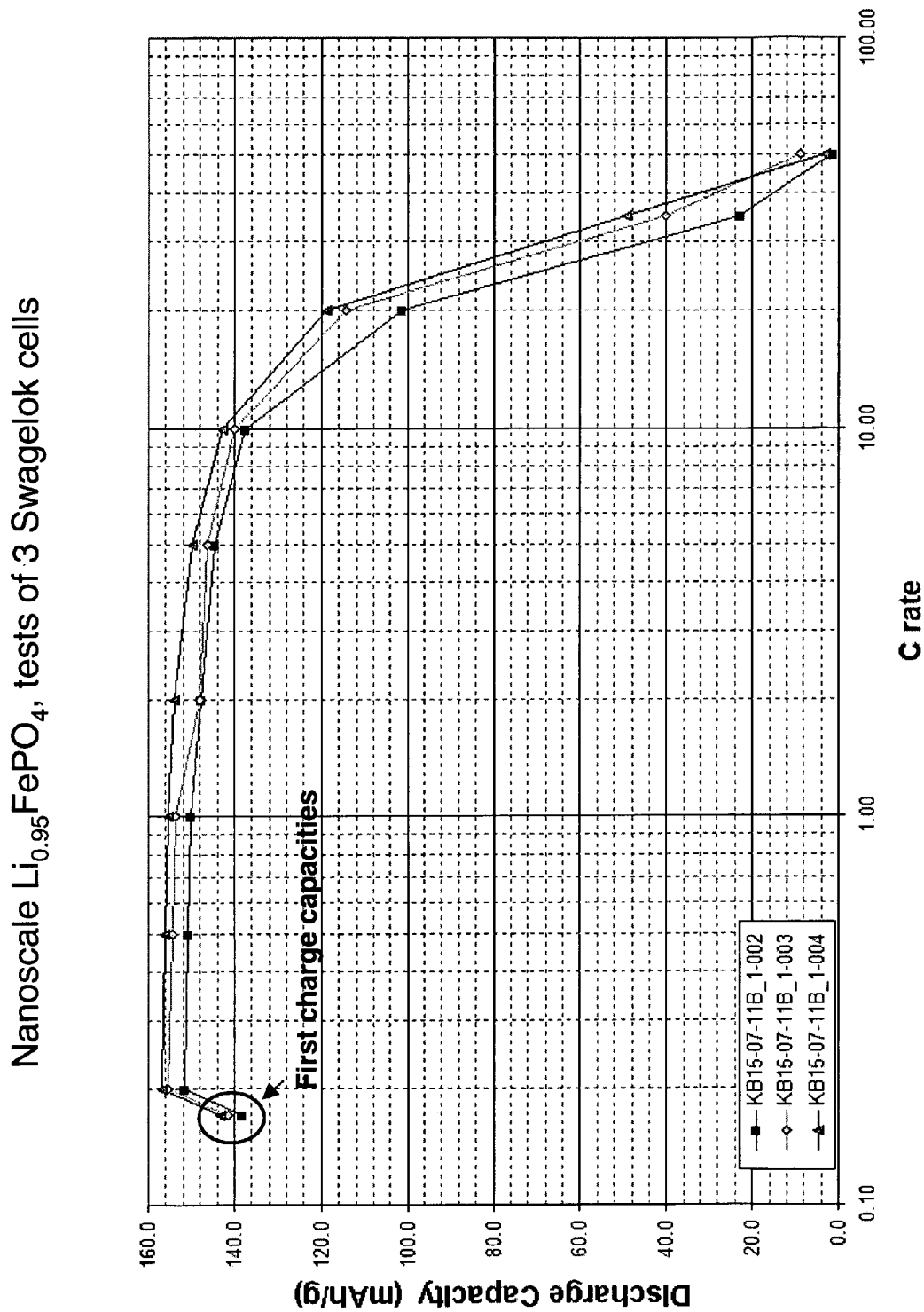
FIG. 19 shows test results from three lithium half-cells constructed using Swagelok hardware as in Example 3.

Nanoscale ion storage materials having overall compositions $LiFePO_4$ and $Li_{0.95}FePO_4$ were synthesized and tested following procedures as described in Example 2, with the mass of lithium carbonate being adjusted so as to achieve the specified overall compositions. The $LiFePO_4$ and $Li_{0.95}FePO_4$ powders were measured by the BET method to have a specific surface areas of 39.78 $m^2/g$ and 46.2 $m^2/g$ respectively, corresponding to equivalent spherical particle diameters of 41.9 nm and 36.1 nm respectively. Combustion analysis showed the two powders to both have residual carbon concentrations of 2.3 wt % and 3 wt % respectively. FIGS. 7 and 8 show the C/50 charge and discharge curves for these two samples compared to a commercially purchased carbon-coated $LiFePO_4$ from Aldrich Chemical Company of several micrometer average particle size and markedly inferior rate capability. Due to the very high rate capability of these materials, see FIG. 19, these low-rate charge/discharge curves show the near-equilibrium voltages of the cells. From these curves it is seen that during continuous charge and discharge, a lithium nonstochiometry x of at least about 15%, and y of at least about 10% is obtained. FIGS. 12-14 show PITT measurements of the nanoscale $Li_{0.95}FePO_4$ sample as described earlier. During a single-step discharge to a voltage 5 mV above the OCV, 4.5% of the total discharge capacity measured at C/50 rate of 160 mAh/g (3.8V to 2V) is measured, showing that greater than about 4.5% nonstoichiometry y can be obtained during dynamic discharging conditions. During a single-step charge to a voltage 5 mV below the OCV, 10.5% of the total charge capacity (2.9V to 3.8V) was measured, showing that greater than about 10.5% nonstoichiometry x exists under dynamic charging conditions. By comparison, the y and x values measured from the capacities at 5 mV above and below the OCV for the comparison sample from Aldrich Chemical is only 0.7% and 1.2% respectively. FIG. 16 and Tables 1 and 2 show X-ray powder diffraction measurements of the nanoscale $Li_{1-x}FePO_4$ sample as described earlier. From the Rietveld refinement of this sample, a crystallite size of about 28 nm was determined, which is close to the calculated equivalent spherical particle size and shows that the high surface area of the sample is due to nanoscale crystallites of the lithium iron phosphate and not due to a high surface area impurity or additive phase. FIG. 19 shows test results from three lithium half-cells constructed using Swagelok hardware as in Example 2.

EXAMPLE 4

In this prophetic example, positive electrodes using a nanoscale ion storage materials, for example, those of Examples 1 and 3 (having been well-characterized in their electrochemical performance over a wide range of C-rates), are used to construct a wound cylindrical lithium-ion cell. A high-rate graphite anode is employed, such as one utilizing graphitized mesocarbon microbeads (MCMB, Osaka Gas Co.) of a few micrometers mean diameter. The performance of such cells, including charge capacity and energy at various C-rates, can be modeled from the volumes and masses of the cell constituents when the density, thickness and performance of individual electrodes in prototype cells is known, as in the present case. Starting from a fully charged state at 3.8V, and discharging to a lower voltage limit of 2.0V, i.e., for 100% depth of discharge, the model shows that such cells will exhibit specific power of at least about 500 W/kg (1000 W/L) at specific energy of at least about 100 Wh/kg (205 Wh/L), specific power of at least about 950 W/kg (2000 W/L) at specific energy of at least about 95 Wh/kg (190 Wh/L), specific power of at least about 1300 W/kg (2500 W/L) at specific energy of at least about 90 Wh/kg (180 Wh/L), and specific power of at least about 1600 W/kg (3200 W/L) at specific energy of at least about 85 Wh/kg (175 WH/L). It is understood that for shallower depth of discharge, the specific power and power density can be significantly higher than these values.

As will be apparent to one of skill in the art from a reading of this disclosure, the present invention can be embodied in forms other than those specifically disclosed above. The particular embodiments described above are, therefore, to be considered as illustrative and not restrictive. The scope of the invention is as set forth in the appended claims, rather than being limited to the examples contained in the foregoing description.

What is claimed is:

1. A high power storage battery comprising:
a cathode including an electroactive material consisting of a nanoscale lithium transition metal phosphate containing only one transition metal, having a specific surface area of at least about 20 $m^2/g$, and comprising at least two co-existing olivine phases, including a lithium-rich transition metal phosphate phase and a lithium-poor transition metal phosphate phase, wherein the percentage molar volume difference between the two phases is less than about 6.4%;
an anode;
an electrolyte in contact with and separating the anode and cathode;
a cathode current collector in electronic communication with the cathode; and
an anode current collector in electronic communication with the anode, wherein the storage battery exhibits specific power of at least about 500 W/kg (1000 W/L) at specific energy of at least about 100 Wh/kg (205 Wh/L).

2. The high power storage battery of claim 1, wherein the battery exhibits specific power of at least about 1300 W/kg (2500 W/L) at specific energy of at least about 90 Wh/kg (180 Wh/L).

3. The high power storage battery of claim 1, wherein the percentage molar volume difference between the two phases is less than about 6.25%.

4. The high power storage battery of claim 1, wherein the percentage molar volume difference between the two phases is less than about 5.75%.

5. The high power storage battery of claim 1, wherein the percentage molar volume difference between the two phases is less than about 5.5%.

6. The high power storage battery of claim 1, wherein each of the two co-existing phases is crystalline and is defined by a unit cell having three lattice parameters, and wherein the differences between at least two of the three lattice parameters between the two unit cells are less than 3%.

7. The high power storage battery of claim 6, wherein the differences in all lattice parameters between the two unit cells are less than 4.7%.

8. The high power storage battery of claim 6, wherein the differences in all lattice parameters between the two unit cells are less than 4.5%.

9. The high power storage battery of claim 6 wherein the differences in all lattice parameters between the two unit cells are less than 4.0%.

10. The high power storage battery of claim 6, wherein the differences in all lattice parameters between the two unit cells are less than 3.5%.

11. The high power storage battery of claim 6, wherein the two co-existing phases have a crystallographic plane in which the misfit strain between the two phases is less than about 1.6%.

12. The high power storage battery of claim 11, wherein the misfit strain between the two phases is less than about 1.5%.

13. The high power storage battery of claim 11, wherein the misfit strain between the two phases is less than about 1.4%.

14. The high power storage battery of claim 11, wherein none of the planes formed by any two of the lattice parameters of a unit cell of the crystal have a misfit strain between the two phases exceeding 8%.

15. The high power storage battery of claim 14, wherein none of the planes formed by any two of the lattice parameters of a unit cell of the crystal have a misfit strain between the two phases exceeding 7.5%.

16. The high power storage battery of claim 14, wherein none of the planes formed by any two of the lattice parameters of a unit cell of the crystal have a misfit strain between the two phases exceeding 6.0%.

17. The high power storage battery of claim 1, wherein the nanoscale lithium transition metal phosphate is a composition of formula $Li_{1-x}MPO_4$, wherein M is one transition metal.

18. The high power storage battery of claim 1, wherein the nanoscale lithium transition metal phosphate is lithium iron phosphate.

19. The high power storage battery of claim 1, wherein the nanoscale lithium transition metal phosphate has a specific surface area of at least about 25 $m^2/g$.

20. The high power storage battery of claim 1, wherein the nanoscale lithium transition metal phosphate has a specific surface area of at least about 30 $m^2/g$.

21. The high power storage battery of claim 1, wherein the nanoscale lithium transition metal phosphate has a specific surface area of at least about 40 $m^2/g$.

* * * * *